United States Patent [19]
Uchiyama et al.

[11] Patent Number: 5,357,359
[45] Date of Patent: Oct. 18, 1994

[54] ALL-OPTICAL POLARIZATION INDEPENDENT OPTICAL TIME DIVISION MULTIPLEXER AND DEMULTIPLEXER WITH BIREFRINGENCE COMPENSATION

[75] Inventors: Kentaro Uchiyama; Toshio Morioka; Masatoshi Saruwatari, all of Kanagawa, Japan

[73] Assignee: Nippon Telegraph and Telephone Corporation, Tokyo, Japan

[21] Appl. No.: 105,812

[22] Filed: Aug. 11, 1993

[30] Foreign Application Priority Data

Aug. 13, 1992 [JP] Japan .................................. 4-216232

[51] Int. Cl.$^5$ .............................................. H04J 4/00
[52] U.S. Cl. .................................. 359/123; 359/122; 359/138; 385/11; 385/24
[58] Field of Search ................ 359/123, 122, 127–128, 359/138–139, 156, 135; 385/11, 24, 41–42, 122; 370/50

[56] References Cited

U.S. PATENT DOCUMENTS 4,761,050 8/1988 Byron ..................................... 385/16

FOREIGN PATENT DOCUMENTS 63-157133 12/1986 Japan .
419717 5/1990 Japan .

OTHER PUBLICATIONS

"All-optical Multistage Demultiplexers Operated by Logical Permutations of Control Pulses" Mori et al., IEEE Transactional Photonics Tech. Letters, vol. 3, No. 12, Dec. 1991, pp. 1130–1133.
"Ultrafast Polarization-Independent Optical Demultiplexer Using Optical Carrier Frequency Shift Through Cross Phase Modulation" Morioka et al., Electronics Letters, vol. 28, No. 11, May 21, 1992–pp. 1070–1072.
"Nonlinear Sagnac Interferometer Switch and Its Application" Jinno et al., IEEE Journal of Quantum Electronics, vol. 28, No. 4, Apr. 1992–pp. 875–882.
Article entitled Ultrafast, Low Power, and Highly Stable All-Optical Switching in an All Polarization Maintaining Fiber Sagnac Interferometer from IEEE Photonics Technology Letters, vol. 2, No. 5, May 1990, pp. 349–351.
Article entitled Polarization–Independent All-Optical Switching from IEEE Photonics Technology Letters, vol. 4 No. 3, dated Mar. 1992, pp. 260 263.
Article entitled Optical Sampling Oscilloscope Using Nonlinear Fibre Loop Mirror dated Nov. 28, 1990 from Electronics Letters dated Jan. 31, 1991 pp. 204 205.

*Primary Examiner*—Richard E. Chilcot, Jr.
*Assistant Examiner*—Kinfe-Michael Negash
*Attorney, Agent, or Firm*—Allegretti & Witcoff, Ltd.

[57] ABSTRACT

An all-optical polarization independent optical time division multiplexer and demultiplexer which are stable as well as very fast, while being independent of the polarization state of the input optical signal pulses. The demultiplexer has a wavelength-division-multiplexing coupler for wavelength-division-multiplexing time-division-multiplexed optical signal pulses and optical control pulses, and splitting the optical signal pulses at a splitting ratio of 1:1 into two ports, the optical control pulses being in a polarization state in which two orthogonally polarized components have a substantially identical amplitude; an optical Kerr medium with birefringence, for connecting two ports of the wavelength-division-multiplexing coupler, the optical Kerr medium incorporating a birefringence compensation mechanism for compensating a polarization dispersion between two principal axes of the birefringence; and a wavelength division demultiplexer for wavelength-division-demultiplexing time-wise overlapping optical signal pulses and optical control pulses propagated through the optical Kerr medium, to obtain time-division-demultiplexed optical signal pulses. In the multiplexer, the input and output relationship is reversed in the same configuration.

20 Claims, 26 Drawing Sheets

ALL-OPTICAL POLARIZATION INDEPENDENT OPTICAL TIME DIVISION MULTIPLEXER AND DEMULTIPLEXER WITH BIREFRINGENCE COMPENSATION

BACKGROUND OF THE INVENTION

1. Field of the Invention

The present invention relates to an all-optical polarization independent optical time division multiplexer and demultiplexer for multiplexing and demultiplexing the modulated optical signal pulses on a time axis by using the optical Kerr effect.

2. Description of the Background Art

Conventionally, there has been a proposition for the all-optical configuration for the multiplexing and demultiplexing of the optical signal pulses on a time axis, using the optical Kerr medium as the optical time division multiplexer and demultiplexer, which utilizes the optical phase shift (optical Kerr effect) induced on the optical signal pulses through the cross-phase modulation by the optical control pulses.

Such a conventional optical time division demultiplexer utilizing the optical Kerr effect is called a nonlinear optical loop mirror, which has a configuration as shown in FIG. 1.

In this configuration of FIG. 1, input optical signal pulses F, which are time-division-multiplexed at a bit rate of $Nf_0$ (bit/s) where N is an integer which is set equal to 2 in FIG. 1, are entered from an input port 12 of an optical circulator (CIR) 11 and directed from an output port 13 of the optical circulator 11 to an input port 16 of an optical wavelength division multiplexer (WF1) 15. On the other hand, optical control pulses G at a bit rate of $f_0$ (bit/s), are entered from an input port 17 of the optical wavelength division multiplexer 15. Then, the wavelength-division-multiplexed pulses obtained from the input optical signal pulses F and the optical control pulses G are outputted from an output port 18 of the optical wavelength division multiplexer 15 to a first input port 20 of a 2×2 optical coupler (CO) 19. The splitting ratio of the optical coupler 19 depends on the wavelengths of the pulses, so that the optical signal pulses are split at the splitting ratio of 1:1 and outputted from both of output ports 22 and 23 of the optical coupler 19, while the optical control pulses are entirely outputted from one output port 22, i.e., at the splitting ratio of 1:0.

The output ports 22 and 23 of the optical coupler 19 are connected with an optical Kerr medium 24, and the pulses propagated through the optical Kerr medium 24 are outputted from a second input port 21 of the optical coupler 19 to an input port 26 of an optical wavelength division demultiplexer (WF2) 25. Then, the output optical signal pulses I are outputted from a first output port 27 of the optical wavelength division demultiplexer 25 as the switched optical signal pulses (transmitted signals), while the optical control pulses are outputted from a second output port 28 of the optical wavelength division demultiplexer 25.

Here, the output ports 22 and 23 of the optical coupler 19 are connected with the optical Kerr medium 24, so that the optical control pulses entered into the optical coupler 19 propagates through the optical Kerr medium 24 only in a clockwise direction, while the optical signal pulses propagates through the optical Kerr medium 24 in both clockwise and counter-clockwise directions.

In this case, the optical signal pulses propagating in the clockwise direction in overlap with the optical control pulses time-wise will have the phase shift $\Delta\phi$ due to the cross-phase modulation. This phase shift $\Delta\phi$ can be expressed by the following equation (1):

$$\Delta\phi = (2\pi/\lambda_s) L \cdot 2n_2 \cdot I_c \tag{1}$$

where $n_2$ is a nonlinear index coefficient of the optical Kerr medium 24, L is a length of the optical Kerr medium 24, $I_c$ is a peak intensity of the optical control pulses, and $\lambda_s$ is a wavelength of the optical signal pulses.

On the other hand, the optical signal pulses propagating in the counter-clockwise direction will receive the phase shift due to the counter-propagating optical control pulses, so that the phase shift takes a very small value proportional to an average power of the optical control pulses.

Consequently, the phase difference between the optical signal pulses which are propagated through the optical Kerr medium 24 in the clockwise and counter-clockwise directions and wavelength-division-multiplexed at the optical coupler 19 can be set to $\pi$ and 0, depending on whether the optical control pulses are present or not. At this point, in a case the phase difference is equal to $\pi$, the optical signal pulses are led to the input port 21 different from the input port 20 from which they have been entered because of the interference effect in the optical coupler 19, whereas they are returned to the input port 20 from which they have been entered.

In other words, among the input optical signal pulses F, only those which had overlapped time-wise with the optical control pulses are outputted to the output port 27 of the optical wavelength division demultiplexer 25 as the switched optical signal pulses (transmitted signals) which are time-division-multiplexed at a bit rate of $f_0$ (bit/s), while the remaining ones are outputted from the output port 14 of the optical circulator 11 through the optical wavelength division multiplexer 15 as the unswitched optical signal pulses (reflected signals) which are time-division-multiplexed at a bit rate of $f_0$ (bit/s), so that the function of the optical time-division-demultiplexing can be realized.

In a case of utilizing this nonlinear optical loop mirror configuration of FIG. 1 as the optical time division multiplexer, the first optical signal pulses to be multiplexed are entered from the input port 12 of the optical circulator 11, while the second optical signal pulses to be multiplexed are entered from the output port 27 of the optical wavelength division demultiplexer 25, such that the second optical signal pulses overlap with the optical control pulses time-wise, and the multiplexed optical signal pulses can be obtained at the output port 14 of the optical circulator 11.

Now, in this configuration of FIG. 1, the above equation (1) for expressing the phase shift $\Delta\phi$ is valid only when the polarizations of the optical signal pulses and the optical control pulses coincide with each other, and the actual phase shift $\Delta\phi$ largely depends on the difference in the polarizations. Consequently, in order to stably operate the nonlinear optical loop mirror configuration of FIG. 1 as the optical time division demultiplexer, it is necessary to put the polarizations of the optical signal pulses and the optical control pulses in coincidence with each other, throughout the entire length of the optical Kerr medium 24. For this reason, conventionally, the optical signal pulses and the optical control pulses have been linearly polarized as shown in FIG. 2, along an identical axis (y axis in FIG. 2).

In addition, it has conventionally been necessary for the optical Kerr medium 24 to be in a form of a polarization maintaining optical fiber having birefringence or an ordinary optical fiber combined with a polarization controller, for the purpose of maintaining the polarization state of the optical signal pulses and the optical control pulses propagated through the optical Kerr medium 24, along a fixed principal axis.

However, in order to operate such conventional optical time division multiplexer and demultiplexer, it has been necessary to detect the polarization state of the input optical signal pulses F and control this polarization state to be in coincidence with that of the optical control pulses G by means of an external circuit.

This requirement, however, presents a particularly difficult problem in the field of the optical fiber communication systems in which the stabilization of the polarization state is quite difficult.

SUMMARY OF THE INVENTION

It is therefore an object of the present invention to provide all-optical polarization independent optical time division multiplexer and demultiplexer which are stable as well as capable of operating at very high speeds, while being independent of the polarization state of the input optical signal pulses.

According to one aspect of the present invention there is provided a polarization independent optical time division demultiplexer, comprising: wavelength-division-multiplexing coupler means for wavelength-division-multiplexing time-division-multiplexed optical signal pulses and optical control pulses, and splitting the optical signal pulses at a splitting ratio of 1:1 into two ports, the optical control pulses being in a polarization state in which two orthogonally polarized components have a substantially identical amplitude; an optical Kerr medium with birefringence, for connecting said two ports of the wavelength-division-multiplexing coupler means, the optical Kerr medium incorporating birefringence compensation means for compensating a polarization dispersion between two principal axes of the birefringence; and wavelength division demultiplexer means for wavelength division demultiplexing timewise overlapping optical signal pulses and optical control pulses propagated through the optical Kerr medium, to obtain time-division-demultiplexed optical signal pulses.

According to another aspect of the present invention there is provided a polarization independent optical time division multiplexer, comprising: wavelength-division-multiplexing coupler means for wavelength-division-multiplexing time-division-multiplexed first optical signal pulses and optical control pulses, and splitting the first optical signal pulses at a splitting ratio of 1:1 into two ports, the optical control pulses being in a polarization state in which two orthogonally polarized components have a substantially identical amplitude; an optical Kerr medium with birefringence, for connecting said two ports of the wavelength-division-multiplexing coupler means, the optical Kerr medium incorporating birefringence compensation means for compensating a polarization dispersion between two principal axes of the birefringence; and wavelength division demultiplexer means for supplying time-division multiplexed second optical signal pulses to the optical Kerr medium through the wavelength-division-multiplexing coupler means; wherein time-division-multiplexed optical signal pulses in which the first and second optical signal pulses are time-division-multiplexed at the optical Kerr medium are outputted from one of the wavelength-division-multiplexing coupler means and the wavelength division demultiplexer means.

Other features and advantages of the present invention will become apparent from the following description taken in conjunction with the accompanying drawings.

DETAILED DESCRIPTION OF THE PREFERRED EMBODIMENTS

Figure 1:
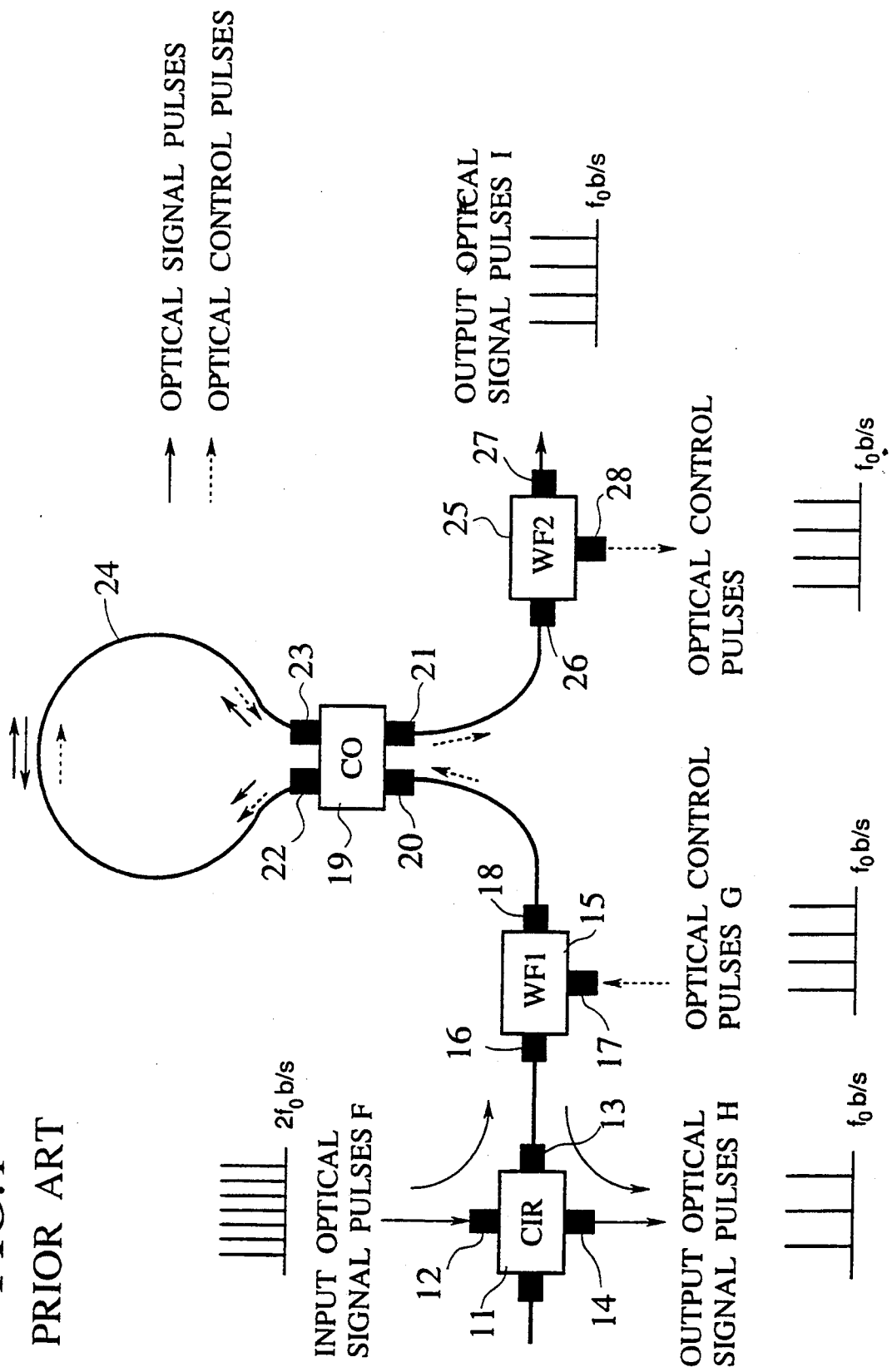
FIG. 1 is a schematic block diagram of a conventional optical time division demultiplexer.
Figure 2:
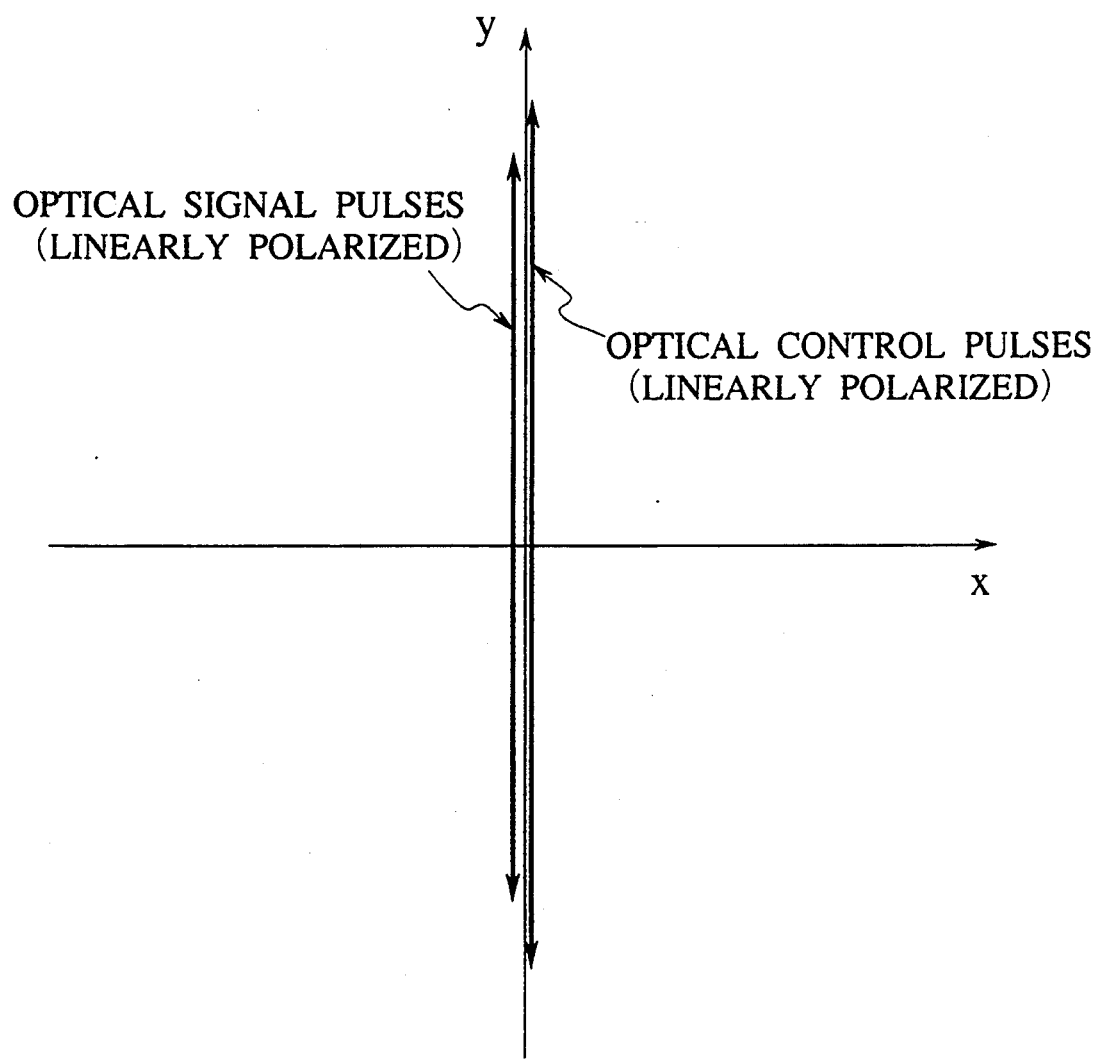
FIG. 2 is a diagram indicating polarization states of the input optical signal pulses and the optical control pulses used in the conventional optical time division demultiplexer of FIG. 1.

Now, various embodiments of all-optical polarization independent optical time division multiplexer and demultiplexer according to the present invention will be described in detail. In the following, those elements which are substantially equivalent to the corresponding elements in the conventional nonlinear optical loop mirror configuration of FIG. 1 described above are given the same reference numerals in the drawings.

Figure 3:
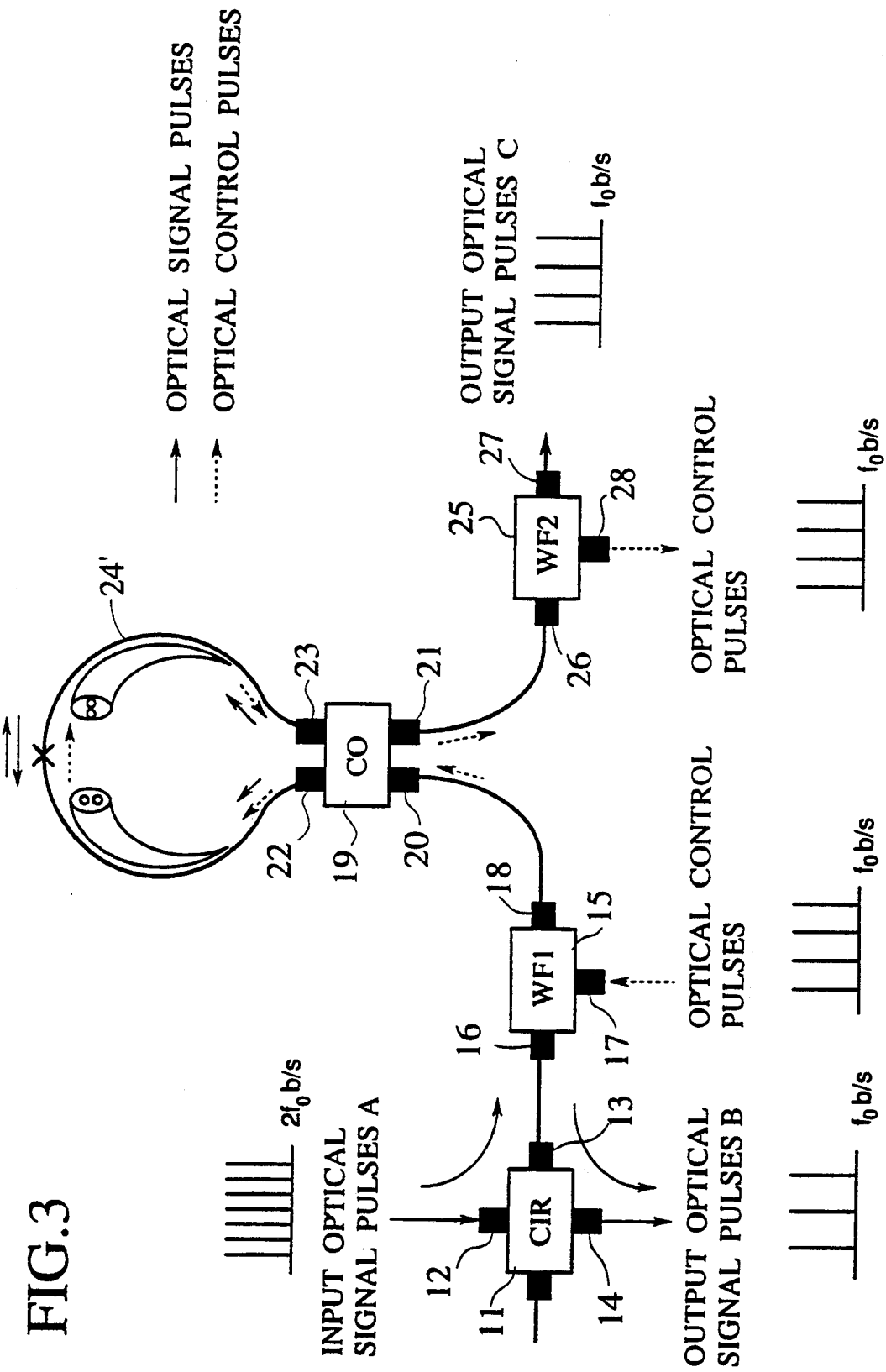
FIG. 3 is a schematic block diagram of a first embodiment of a polarization independent optical time division demultiplexer according to the present invention.

Referring first to FIG. 3, a first embodiment of all-optical polarization independent optical time division demultiplexer according to the present invention will be described.

In this first embodiment, the optical polarization independent optical time division demultiplexer comprises: an optical circulator (CIR) 11 having an input port 12 and output ports 13 and 14; an optical wavelength division multiplexer (WF1) 15 having input ports 16 and 17 and an output port 18, of which the input port 16 is connected with the output port 13 of the optical circulator 11; a 2×2 optical coupler (CO) 19 having input ports 20 and 21 and output ports 22 and 23, of which the input port 20 is connected with the output port 18 of the optical wavelength division multiplexer 15, and which constitutes a wavelength division multiplexing coupler together with the wavelength division multiplexer 15; an optical Kerr medium 24' connecting the output ports 22 and 23 of the optical coupler 19; and an optical wavelength division demultiplexer (WF2) 25 having an input port 26 and output ports 27 and 28, of which the input port 26 is connected with the output port 21 of the optical coupler 19.

In this first embodiment, the optical Kerr medium 24' is formed by two polarization maintaining optical fibers of birefringence type and of the same length, which are cross-spliced, i.e., connected with each other at a middle of the optical Kerr medium 24' with their principal axes rotated by 90° with respect to each other. Here, it is to be noted that any other optical Kerr medium with the birefringence can be used instead of two polarization maintaining optical fibers.

In addition, the optical control pulses, which are time-division-multiplexed at a bit rate of $f_0$ (bit/s), are set in a polarization state which has the identical amplitudes for the x-axis component and the y-axis component of the Kerr medium. For example, the optical control pulses may be linearly polarized at 45° with respect to x and y axes, or circularly polarized. In general, the optical control signals are elliptically polarized with the principal axis of the elliptical polarization at 45° with respect to x and y axes of the Kerr medium.

Here, it is to be noted that, when the nonlinear index coefficient $n_2$ appearing in the equation (1) for the phase shift $\Delta\phi$ described above or the propagation loss is not exactly identical in two principal axes of two polarization maintaining optical fibers of birefringence type forming the optical Kerr medium 24', the optical control pulses can be set in a polarization state which has not exactly identical but only roughly identical amplitudes for the x-axis component and the y-axis component of the Kerr medium in order to compensate for the difference of the nonlinear index coefficient $n_2$ or the propagation loss in two principal axes of two polarization maintaining optical fibers of birefringence type forming the optical Kerr medium 24'.

Then, when the input optical signal pulses A, which are time-division-multiplexed at a bit rate of $Nf_0$ (bit/s), are entered from the input port 12 of the optical circulator 11, the unswitched and switched output optical signal pulses B and C (reflected and transmitted signals), with the repetition frequency equal to $f_0$ (bit/s) are outputted from the output port 14 of the optical circulator 11 and the output port 27 of the optical wavelength division demultiplexer 25, respectively.

Figure 4:
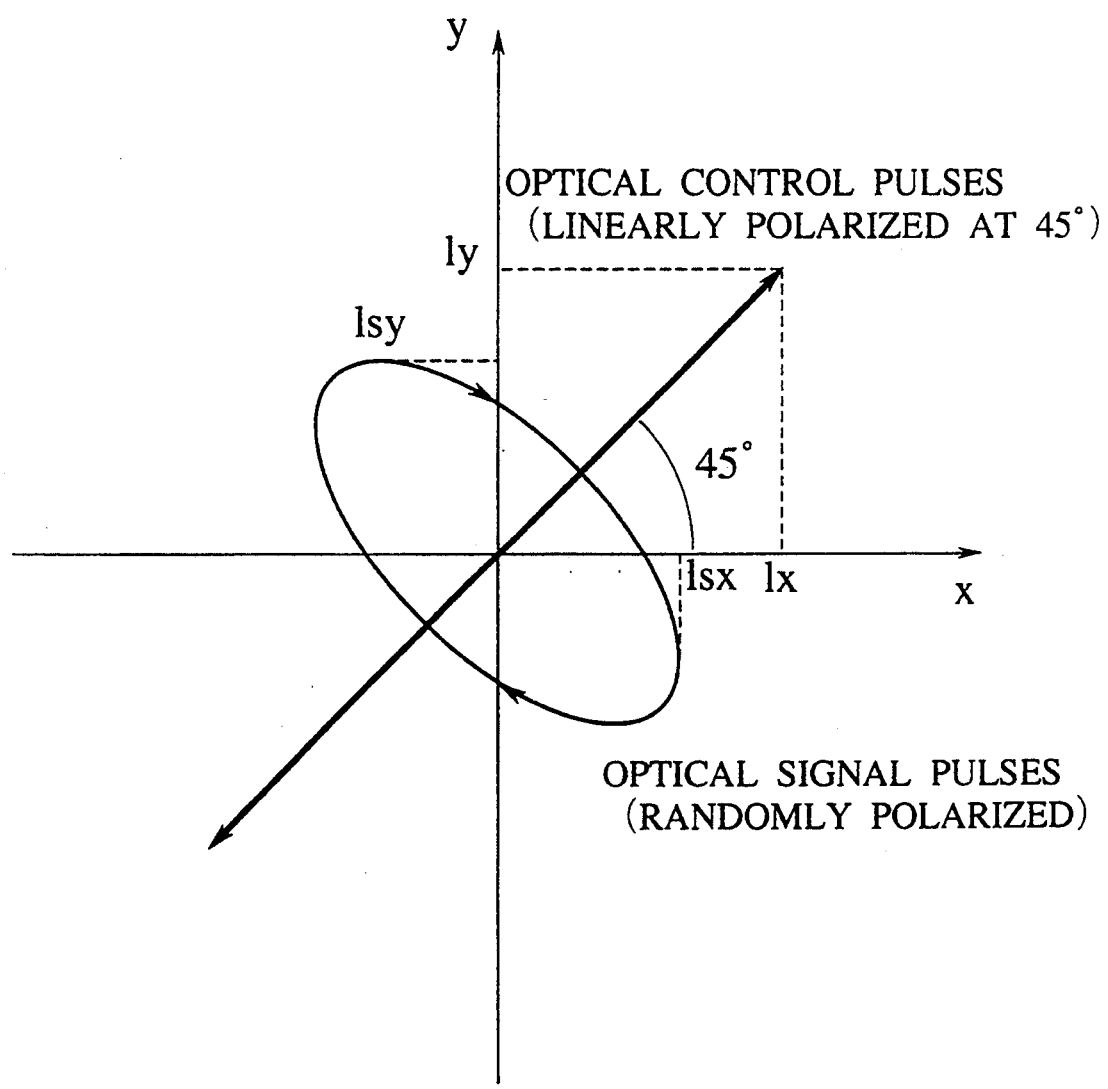
FIG. 4 is a diagram indicating polarization states of the input optical signal pulses and the optical control pulses used in the polarization independent optical time division demultiplexer of FIG. 3.

In this configuration of FIG. 3, when the optical control pulses are linearly polarized at 45° with respect to the principal axis of the optical Kerr medium 24' with birefringence, as shown in FIG. 4, the phase shift induced on the optical signal pulses due to the optical control pulses can be expressed as follows.

Namely, in this case, the two principal axes components Ix and Iy of the optical control pulses have the relationship of the following equation (2).

$$Ix = Iy \qquad (2)$$

On the other hand, the optical signal pulses are entered in to the optical Kerr medium 24' with birefringence in a random polarization state, and split into two linearly polarized principal axes components Isx and Isy, as shown in FIG. 4, according to the direction of this random polarization state.

At this point, the phase shift $\Delta\phi x$ induced on one principal axis (x axis) component of the optical signal pulses is given by a sum of the phase shift induced by the optical control pulses polarized in the identical direction and the phase shift induced by the optical control pulses polarized in the perpendicular direction. Namely, the phase shift $\Delta\phi x$ can be expressed by the following equation (3).

$$\begin{aligned}\Delta\phi x &= \Delta\phi x^H + \Delta\phi x^V \\ &= (2\pi/\lambda s)(L \cdot n_2^H \cdot Ix + \eta \cdot L \cdot n_2^V \cdot Iy)\end{aligned} \qquad (3)$$

where the superscript H denotes the quantity related to the optical control pulses polarized in the identical (horizontal) direction, the superscript V denotes the quantity related to the optical control pulses polarized in the perpendicular (vertical) direction, $n_2$ is a nonlinear index coefficient of the optical Kerr medium 24', L is a length of the optical Kerr medium 24', $\lambda s$ is a wavelength of the optical signal pulses, and $\eta$ ($0<\eta<1$) is a coefficient indicating an effect of the polarization dispersion.

Similarly, the phase shift $\Delta\phi y$ induced on another principal axis (y axis) component of the optical signal pulses can be expressed by the following equation (4).

$$\begin{aligned}\Delta\phi y &= \Delta\phi y^H + \Delta\phi y^V \\ &= (2\pi/\lambda)(L \cdot n_2^H \cdot Iy + \eta \cdot L \cdot n_2^V \cdot Iy)\end{aligned} \qquad (4)$$

Consequently, from the above equations (2), (3), and (4), it follows that:

$$\Delta\phi x = \Delta\phi y \qquad (5)$$

so that the identical phase shift is induced to the components of the optical signal pulses along the two principal axes of the birefringence.

As a result, it becomes possible to induce the identical phase shifts $\Delta\phi x$ and $\Delta\phi y$ on the optical signal pulses in the random polarization state, so that the input optical signal pulse polarization dependency of the switching operation can be eliminated.

Figure 5:
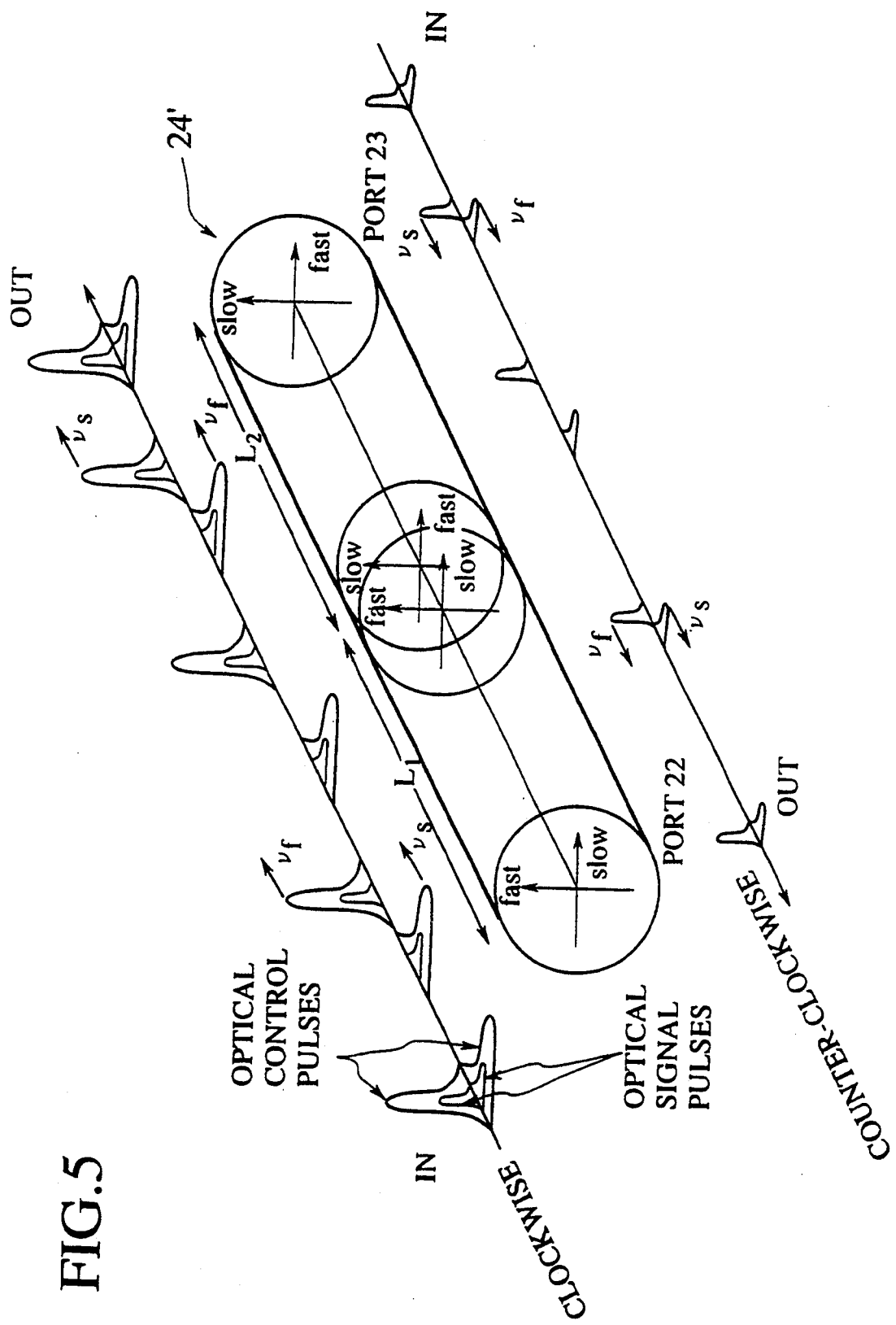
FIG. 5 is an illustrative diagram indicating a manner of signal transmission through an optical Kerr medium used in the polarization independent optical time division demultiplexer of FIG. 3.

Here, as described above, the optical Kerr medium 24' is formed by two polarization maintaining optical fibers of birefringence type and of the same length, which are connected with each other at a middle of the optical Kerr medium 24' with their principal axes rotated by 90° with respect to each other, so that as indicated in FIG. 5, when the optical signal pulses and the optical control pulses propagate through the loop shaped optical Kerr medium 24', the polarization component propagated along a fast axis of one polarization maintaining optical fiber is propagated along a slow axis of another polarization maintaining optical fiber, while the polarization component propagated along a slow axis of one polarization maintaining optical fiber is propagated along a fast axis of another polarization maintaining optical fiber.

Consequently, at the output ends of the optical Kerr medium 24', the birefringence of the optical Kerr medium 24' is totally compensated, and the relative position of the two principal axes polarization components on a time axis remains the same as in the input optical signal pulses, so that it becomes possible to compensate the polarization dispersion between two principal axes.

Figure 6:
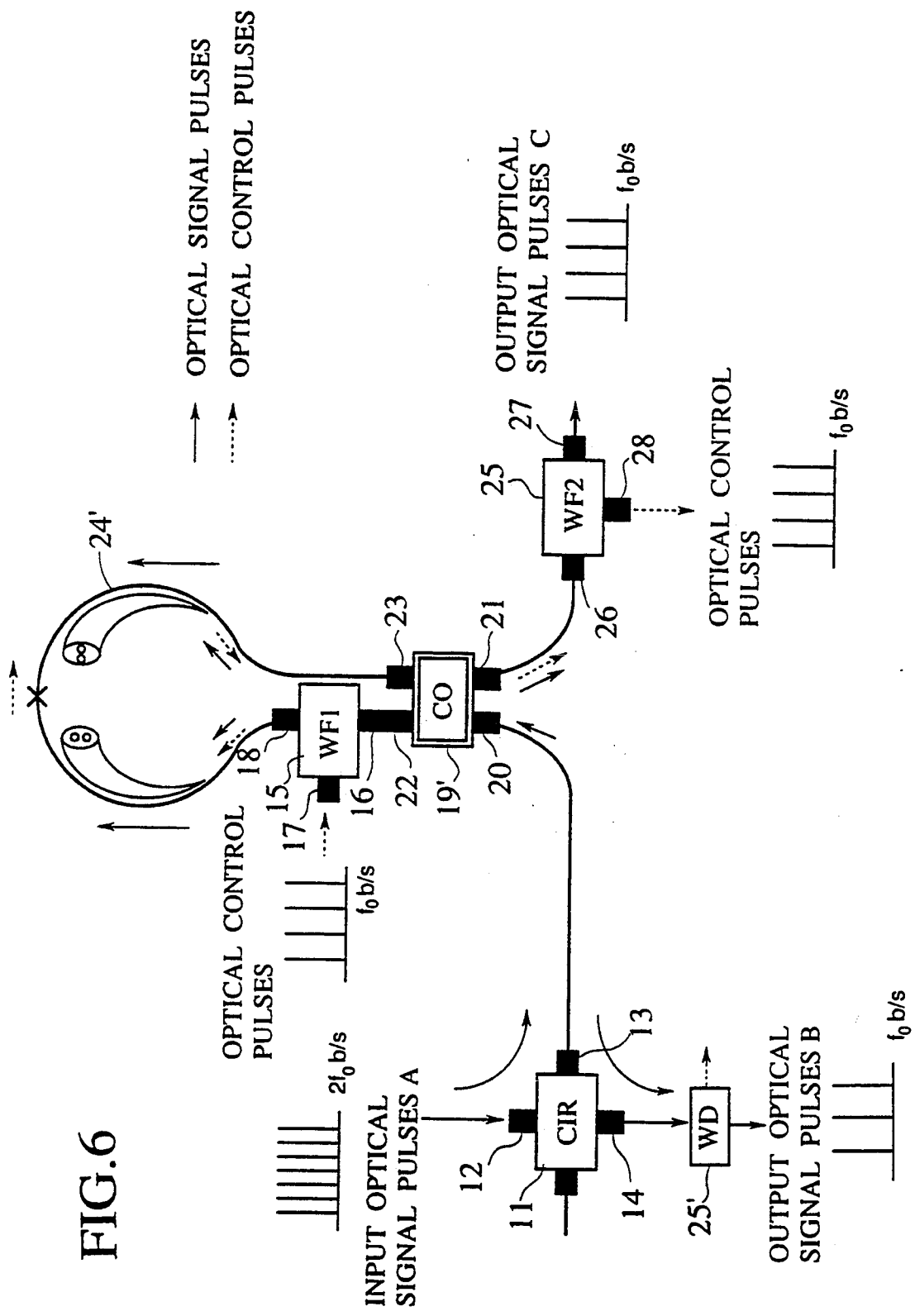
FIG. 6 is a schematic block diagram of a second embodiment of a polarization independent optical time division demultiplexer according to the present invention.

Referring next to FIG. 6, a second embodiment of all-optical polarization independent optical time division demultiplexer according to the present invention will be described.

The optical polarization independent optical time division demultiplexer of this second embodiment differs from that of the first embodiment of FIG. 3 described above in that: the optical coupler 19 of the wavelength dependent type is replaced by an optical coupler 19' of the wavelength independent type; the order of the wavelength division multiplexer 15 and the optical coupler 19' are reversed in the wavelength-division-multiplexing coupler such that the optical wavelength division multiplexer 15 is located between the output port 22 of the optical coupler 19' and one end of the optical Kerr medium 24', instead of between the output port 13 of the optical circulator 11 and the input port 20 of the optical coupler 19 as in the first embodiment; and an additional optical wavelength division demultiplexer (WD) 25' is connected to the output port 14 side of the optical circulator 11.

Accordingly, the output port 13 of the optical circulator 11 is directly connected with the input port 20 of the optical coupler 19', and the output port 22 of the optical coupler 19' is connected with the input port 16 of the optical wavelength division multiplexer 15. while the output port 18 of the optical wavelength division multiplexer 15 is connected with one end of the optical Kerr medium 24'. The remaining features of this second embodiment of FIG. 6 are substantially similar to those of the first embodiment of FIG. 3.

In this configuration of FIG. 6, the optical coupler 19' is the wavelength independent type which is only required to have the characteristic that the splitting ratio for the optical signal pulses is 1:1, and it becomes unnecessary to satisfy the condition that the optical control pulses are entirely outputted from one output port 22 at the splitting ratio of 1:0, so that this second embodiment is practically quite advantageous over the first embodiment described above.

Figure 7:
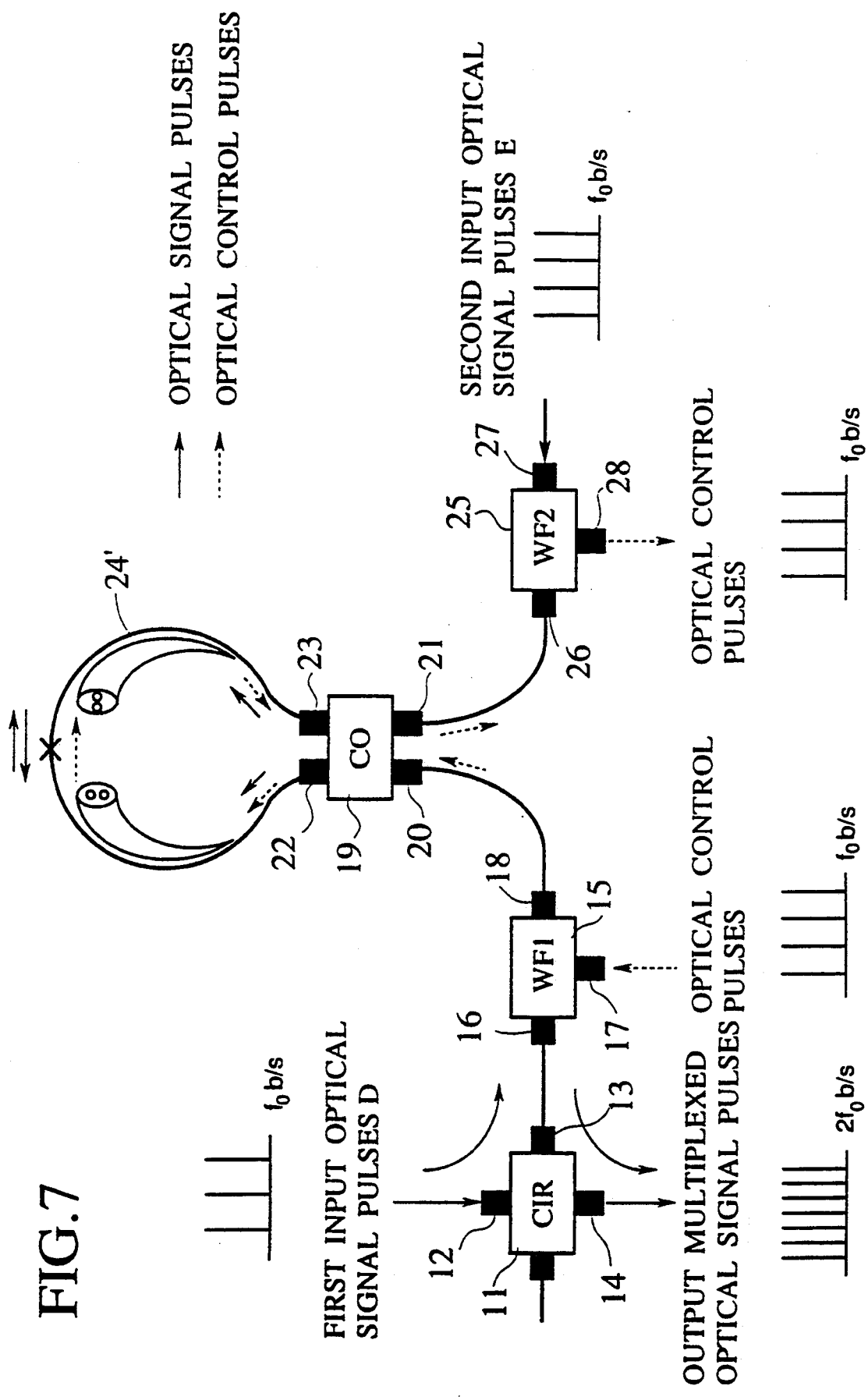
FIG. 7 is a schematic block diagram of a first embodiment of a polarization independent optical time division multiplexer according to the present invention.

Referring next to FIG. 7, a first embodiment of all-optical polarization independent optical time division multiplexer according to the present invention will be described.

The optical polarization independent optical time division multiplexer of this first embodiment shown in FIG. 7 has a configuration identical to that of the first embodiment of the optical polarization independent optical time division demultiplexer shown in FIG. 3, but the input and output relationship is reversed.

Namely, in this configuration of FIG. 7, the first input signal pulses D to be multiplexed which has the repetition frequency equal to $f_0$ (bit/s) are entered from the input port 12 of the optical circulator 11, while the second input signal pulses E to be multiplexed which has the repetition frequency equal to $f_0$ (bit/s) are entered from the output port 27 of the optical wavelength division demultiplexer 25, such that the optical control pulses and the second input optical signal pulses E overlap with each other time-wise, and the output multiplexed optical signal pulses in which the first and second input optical signal pulses D and E are multiplexed together can be outputted from the output port 14 of the optical circulator 11. Here, it is to be noted that the first and second input optical signal pulses D and E must be entered at such timings that they do not overlap with each other time-wise.

In further detail, the first input optical signal pulses D in a random polarization state are entered into the optical wavelength division multiplexer 15 through the optical circulator 11, and wavelength-division-multiplexed with the optical control pulses, and then the wavelength-division-multiplexed pulses are led to the input port 20 of the optical coupler 19. On the other hand, the second input optical signal pulses E in a random polarization state are led to the input port 21 of the optical coupler 19 through the optical wavelength division demultiplexer 25. Here, the input timings of the optical control pulses and the second input optical signal pulses E are such that they overlap with each other time-wise.

As a result, in the loop section formed by the optical Kerr medium 24' and the optical coupler 19, the optical control pulses induce the phase shift of $\pi$ to the second input optical signal pulses E, while inducing no phase shift to the first input optical signal pulses D, so that both of the first and second input optical signal pulses D and E are outputted to the input port 20 of the optical coupler 19. Then, the output multiplexed optical signal pulses in which the first and second input optical signal pulses D and E are time-division-multiplexed are obtained at the optical wavelength division multiplexer 15 and outputted from the output port 14 of the optical circulator 11. In this case, the optical control pulses are also outputted from the output port 28 of the optical wavelength division demultiplexer 25.

It is to be noted here that, in this first embodiment of the optical polarization independent optical time division multiplexer, it is made possible to induce the identical phase shifts $\Delta\phi x$ and $\Delta\phi y$ on the optical signal pulses in the random polarization state, such that the input optical signal pulse polarization dependency of the switching operation can be eliminated, by setting the optical control pulses in a polarization state which has the identical amplitudes for the x-axis component and the y-axis component of the Kerr medium, just as in the case of the optical polarization independent optical time division demultiplexer described above.

In addition, in this first embodiment of the optical polarization independent optical time division multiplexer, the optical Kerr medium 24' is formed by two polarization maintaining optical fibers of birefringence type and of the same length, which are cross-spliced, i.e., connected with each other at a middle of the optical Kerr medium 24' with their principal axes rotated by 90° with respect to each other, so that at the output ends of the optical Kerr medium 24', the birefringence of the optical Kerr medium 24' is totally compensated, and the relative position of the two principal axes polarization components on a time axis remains the same as in the input optical signal pulses, and it becomes possible to compensate the polarization dispersion between two principal axes, just as in the case of the optical polarization independent optical time division demultiplexer described above.

Figure 8:
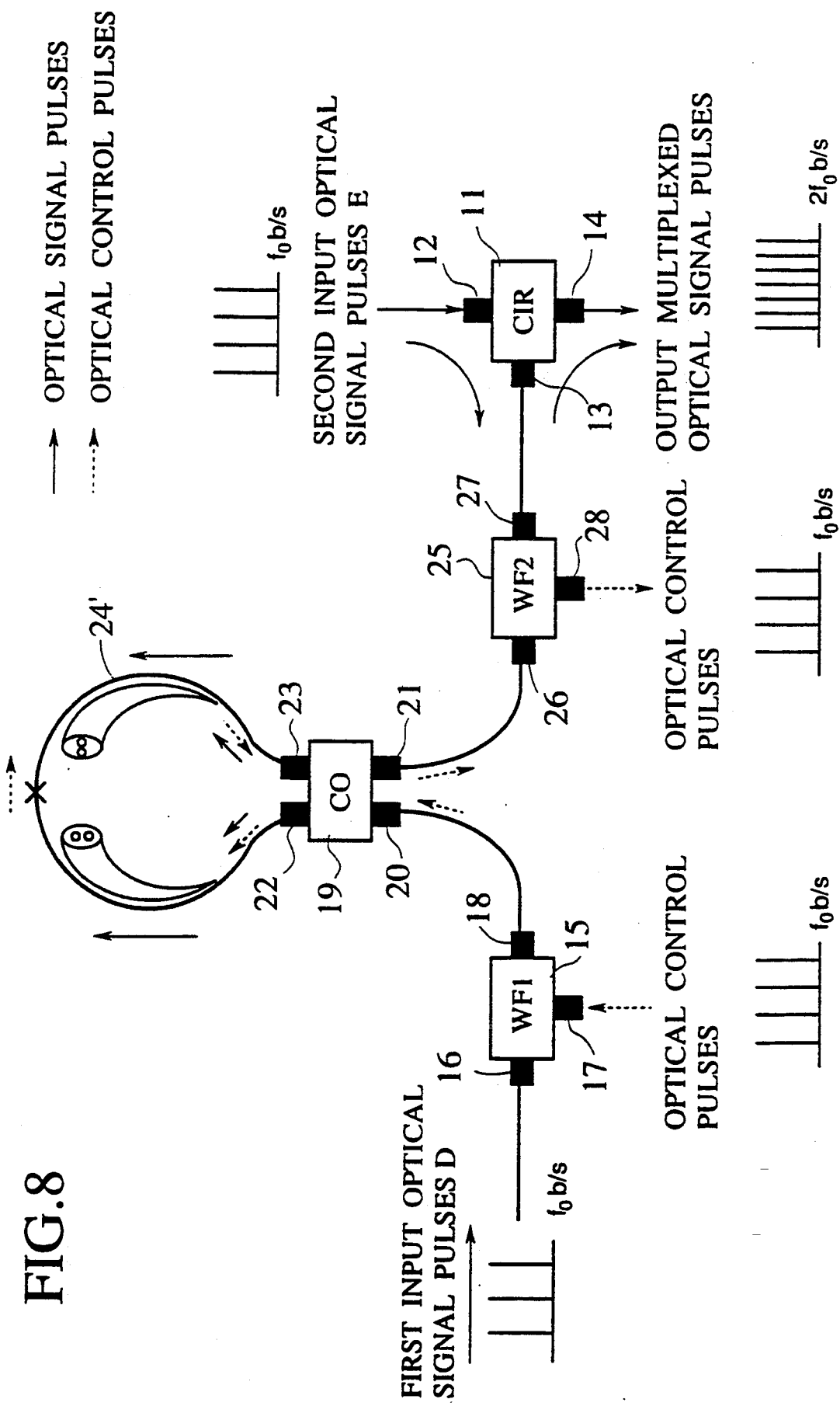
FIG. 8 is a schematic block diagram of a second embodiment of a polarization independent optical time division multiplexer according to the present invention.

Referring next to FIG. 8, a second embodiment of all-optical polarization independent optical time division multiplexer according to the present invention will be described.

The optical polarization independent optical time division multiplexer of this second embodiment differs from that of the first embodiment of FIG. 7 described above in that the optical circulator 11 is located on the optical wavelength division demultiplexer 25 side, instead of the optical wavelength division multiplexer 15 side as in the first embodiment. Accordingly, the output port 27 of the optical wavelength division demultiplexer 25 is connected with the output port 13 of the optical circulator 11, and the first input optical signal pulses D are entered directly into the input port 16 of the optical wavelength division multiplexer 15 at such timings that the first input optical signal pulses D overlap with the optical control pulses time-wise, while the second input optical signal pulses E are entered into the input port 12 of the optical circulator 11, such that the output multiplexed optical signal pulses can be obtained at the output port 14 of the optical circulator 11. The remaining features of this second embodiment of FIG. 8 are substantially similar to those of the first embodiment of FIG. 7.

In further detail, the first input optical signal pulses D in a random polarization state are entered into the optical wavelength division multiplexer 15, and wavelength-division-multiplexed with the optical control pulses, and then the wavelength-division-multiplexed pulses are led to the input port 20 of the optical coupler 19. On the other hand, the second input optical signal pulses E in a random polarization state are led to the input port 21 of the optical coupler 19 through the optical circulator 11 and the optical wavelength division demultiplexer 25. Here, the input timings of the optical control pulses and the first input optical signal pulses D are such that they overlap with each other time-wise.

As a result, in the loop section formed by the optical Kerr medium 24' and the optical coupler 19, the optical control pulses induce the phase shift of $\pi$ to the first input optical signal pulses D, while inducing no phase shift to the second input optical signal pulses E, so that both of the first and second input optical signal pulses D and E are outputted to the input port 21 of the optical coupler 19. Then, the output multiplexed optical signal pulses in which the first and second input optical signal pulses D and E are time-division-multiplexed are obtained at the optical wavelength division demultiplexer 25 and outputted from the output port 14 of the optical circulator 11. In this case, the optical control pulses are also outputted from the output port 28 of the optical wavelength division demultiplexer 25.

It should be apparent that the same effects as in the first embodiment described above can be achieved by this second embodiment.

Figure 9:
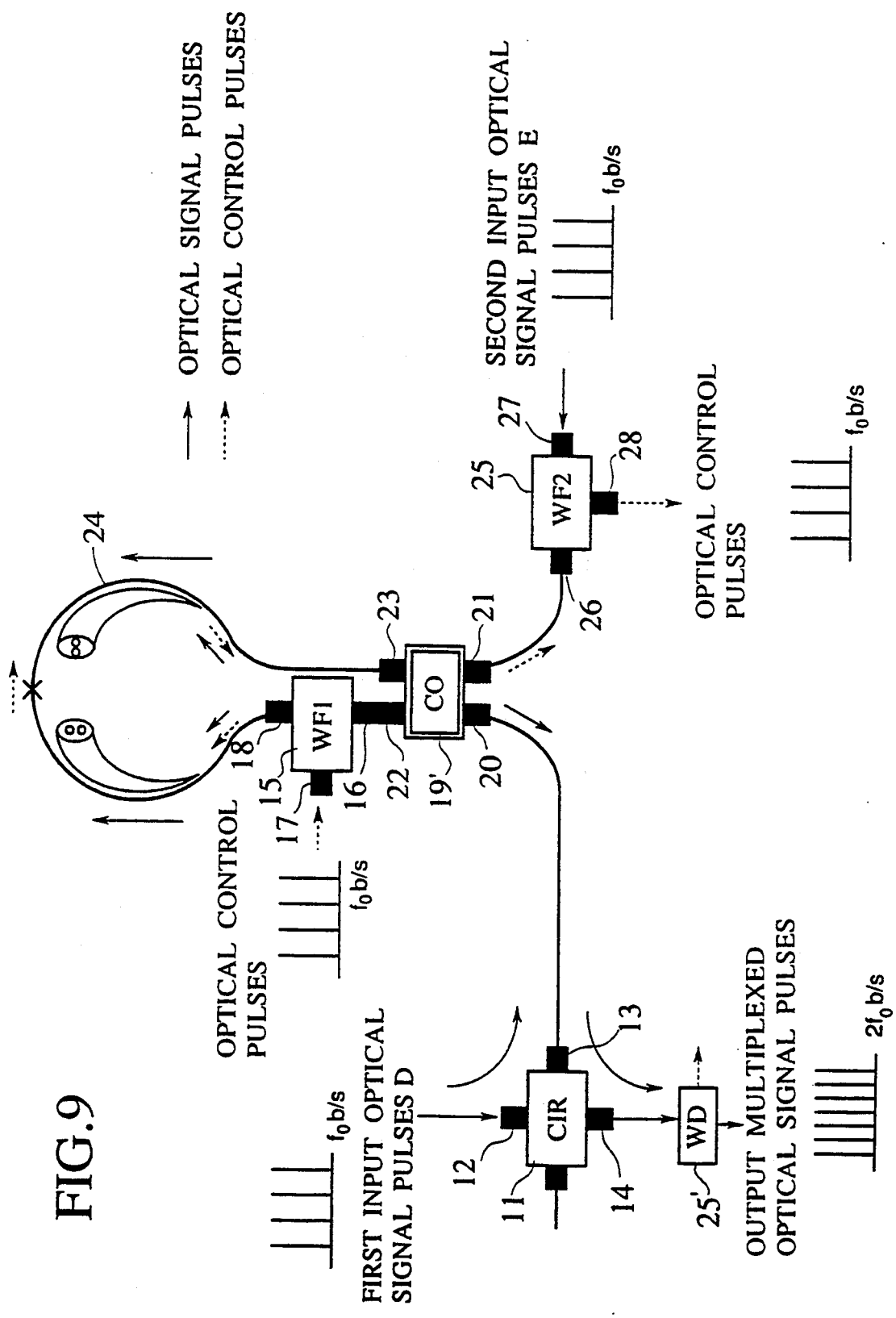
FIG. 9 is a schematic block diagram of a third embodiment of a polarization independent optical time division multiplexer according to the present invention.

Referring next to FIG. 9, a third embodiment of all-optical polarization independent optical time division multiplexer according to the present invention will be described.

The optical polarization independent optical time division multiplexer of this third embodiment differs from that of the first embodiment of FIG. 7 described above in that: the optical coupler 19 of the wavelength dependent type is replaced by an optical coupler 19' of the wavelength independent type; the order of the wavelength division multiplexer 15 and the optical coupler 19' is reversed in the wavelength-division-multiplexing coupler such that the optical wavelength division multiplexer 15 is located between the output port 22 of the optical coupler 19' and one end of the optical Kerr medium 24', instead of between the output port 13 of the optical circulator 11 and the input port 20 of the optical coupler 19 as in the first embodiment; and an additional optical wavelength division demultiplexer (WD) 25' is connected to the output port 14 side of the optical circulator 11.

Accordingly, the output port 13 of the optical circulator 11 is directly connected with the input port 20 of the optical coupler 19', and the output port 22 of the optical coupler 19' is connected with the input port 16 of the optical wavelength division multiplexer 15 while the output port 18 of the optical wavelength division multiplexer 15 is connected with one end of the optical Kerr medium 24'. The remaining features of this third embodiment of FIG. 9 are substantially similar to those of the first embodiment of FIG. 7.

In this configuration of FIG. 9, the optical coupler 19' is of the wavelength independent type which is only required to have the characteristic that the splitting ratio for the optical signal pulses is 1:1, and it becomes unnecessary to satisfy the condition that the optical control pulses are entirely outputted from one output port 22 at the splitting ratio of 1:0, so that this third embodiment is practically quite advantageous over the first embodiment described above.

Figure 10:
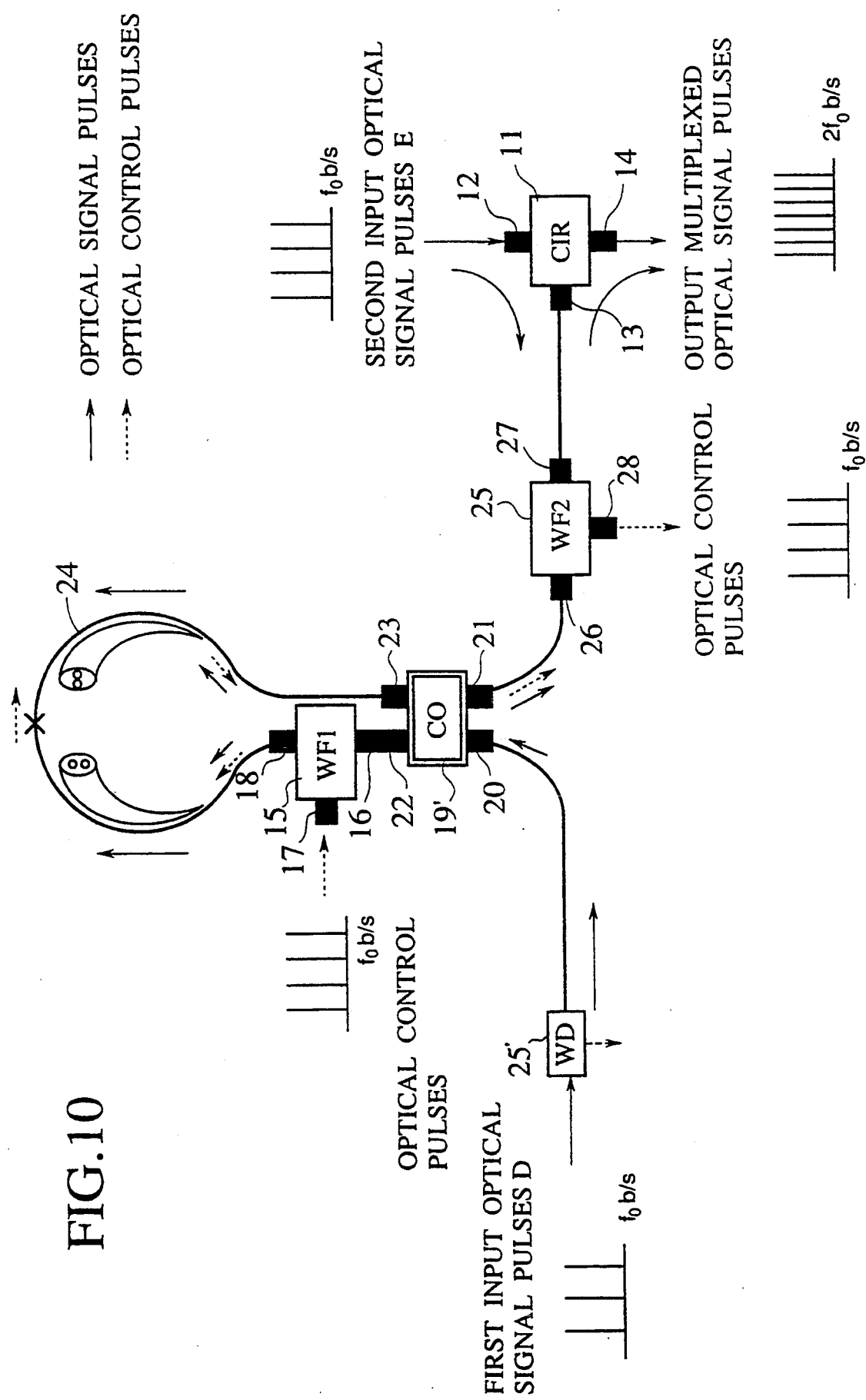
FIG. 10 is a schematic block diagram of a fourth embodiment of a polarization independent optical time division multiplexer according to the present invention.

Referring next to FIG. 10, a fourth embodiment of all-optical polarization independent optical time division multiplexer according to the present invention will be described.

The optical polarization independent optical time division multiplexer of this fourth embodiment differs from that of the third embodiment of FIG. 9 described above in that: the optical circulator 11 is located on the optical wavelength division demultiplexer 25 side, instead of the optical wavelength division multiplexer 15 side as in the first embodiment; and the additional optical wavelength division demultiplexer 25' is connected to the input port 20 side of the optical coupler 19', instead of the output port 14 side of the optical circulator 11 as in the third embodiment.

Accordingly, the output port 27 of the optical wavelength division demultiplexer 25 is connected with the output port 13 of the optical circulator 11, and the first input optical signal pulses D are entered into the input port 16 of the optical wavelength division multiplexer 15 at such timings that the first input optical signal pulses D overlap with the optical control pulses timewise, while the second input optical signal pulses E are entered into the input port 12 of the optical circulator 11, such that the output multiplexed optical signal pulses can be obtained at the output port 14 of the optical circulator 11. The remaining features of this fourth embodiment of FIG. 10 are substantially similar to those of the third embodiment of FIG. 9.

It should be apparent that the same effects as in the third embodiment described above can be achieved by this fourth embodiment.

It is to be noted that, in the various embodiments described above, the optical circulator 11 can be replaced by a combination of a 2×2 optical coupler and an optical isolator capable of furnishing the substantially equivalent function as the optical circulator 11. Also, the optical wavelength division multiplexer 15 can be replaced by an optical coupler capable of furnishing the substantially equivalent function as the optical wavelength division multiplexer 15. Moreover, the optical wavelength division demultiplexer 25 can be replaced by a band pass filter capable of furnishing the substantially equivalent function as the optical wavelength division demultiplexer 25.

It is also noted that, in the various embodiments described above, the optical Kerr medium 24' has been described as that which is formed by cross-splicing just two polarization maintaining optical fibers of birefringence type and of the same length, but more than two cross-spliced polarization maintaining optical fibers of appropriate, not necessarily equal lengths may be used to achieve the overall effective birefringence compensation equivalent to that realized by two cross-spliced polarization maintaining optical fibers of birefringence type and of the same length.

Figure 11:
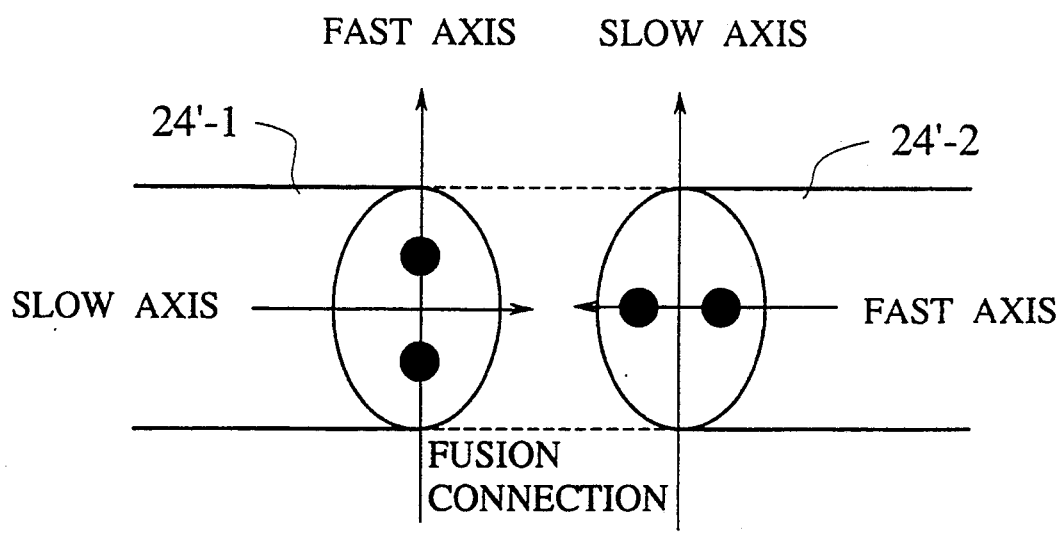
FIG. 11 is a schematic diagram indicating a birefringence compensation mechanism in a form of a cross-splicing of two polarization maintaining optical fibers used in the embodiments of FIGS. 3 and 6-10.

It is also to be noted that, in the various embodiments described above, the optical Kerr medium 24' has been described as that which is formed by two polarization maintaining optical fibers of birefringence type and of the same length, which are cross-spliced, in order to achieve the birefringence compensation. As shown in FIG. 11, this birefringence compensation mechanism in a form of a cross-splicing of two polarization maintaining optical fibers can be actually realized by a fusion connection of the polarization maintaining optical fibers 24'-1 and 24'-2 at a middle of the optical Kerr medium 24' with their principal axes rotated by 90° with respect to each other, such that a fast axis of one polarization maintaining optical fiber 24'-1 is aligned with a slow axis of another polarization maintaining optical fiber 24'-2, and a slow axis of one polarization maintaining optical fiber 24'-1 is aligned with a fast axis of another polarization maintaining optical fiber 24'-2.

Now, the effect of the birefringence compensation mechanism in a form of this cross-splicing of FIG. 11 can also be realized by the following alternative configurations.

Figure 12A:
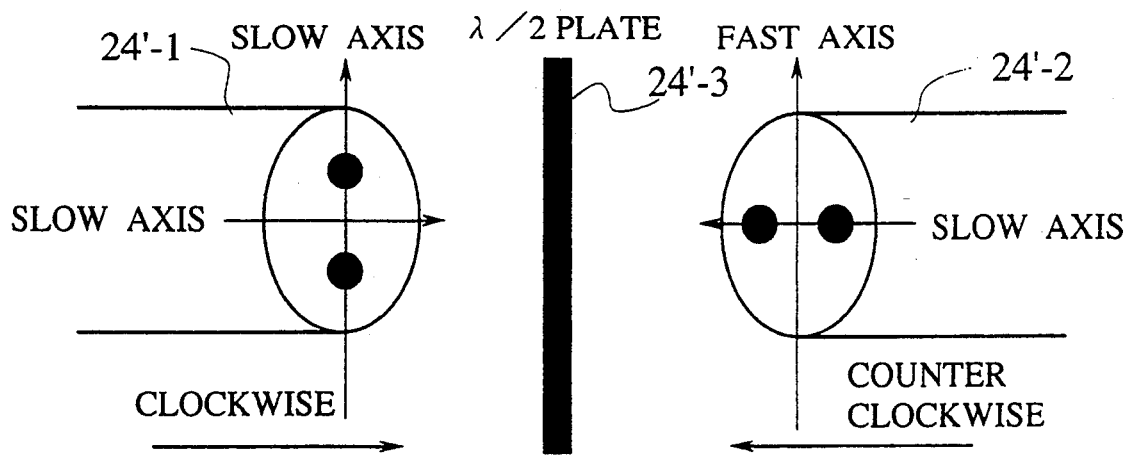
FIG. 12 is a schematic diagram indicating an alternative configuration for a birefringence compensation mechanism that can be used in the embodiments of FIGS. 3 and 6-10.
Figure 12B:
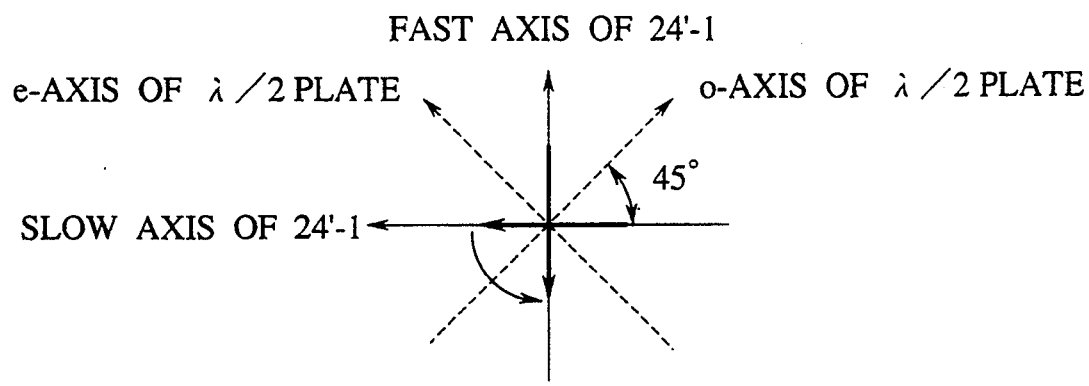
Figure 12C:
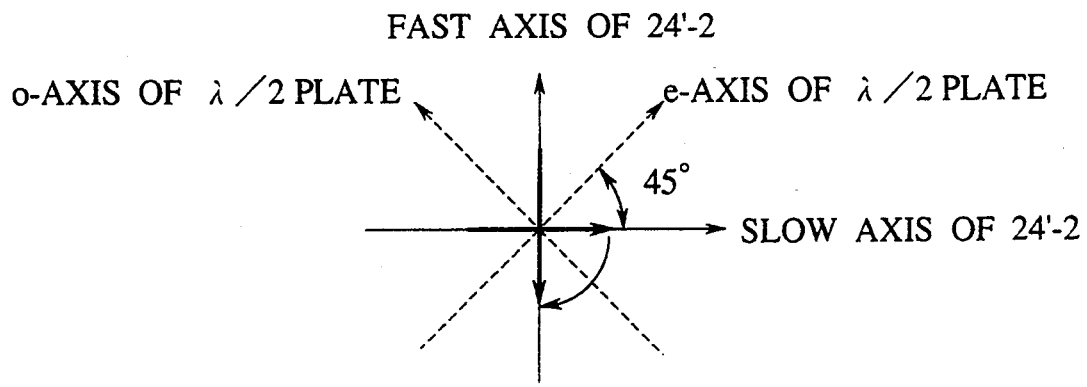

First, as shown in FIG. 12A, two polarization maintaining optical fibers 24'-1 and 24'-2 can be connected with a λ/2 plate 24'-3 inserted therebetween, while the fast axes and the slow axes of the polarization maintaining optical fibers aligned with each other. In this configuration, looking from the polarization maintaining optical fiber 24'-1 side, the λ/2 plate 24'-3 has an o-axis inclined by 45° to the right from the fast axis and an e-axis inclined by 45° to the left from the fast axis such that the λ/2 plate 24'-3 rotates a direction of the linear polarization along the slow axis clockwise for 90° to turn it into a direction along the fast axis, as shown in FIG. 12B, while looking from the polarization maintaining optical fiber 24'-2 side, the λ/2 plate 24'-3 has an o-axis inclined by 45° to the left from the fast axis and an e-axis inclined by 45° to the right from the fast axis such that the λ/2 plate 24'-3 rotates a direction of the linear polarization along the slow axis counter-clockwise for 90° to turn it into a direction along the fast axis, as shown in FIG. 12C.

In this configuration of FIG. 12A, when the optical signal pulses and the optical control pulses propagate through the loop shaped optical Kerr medium 24', the polarization component propagated along a fast axis of one polarization maintaining optical fiber 24'-1 is propagated along a slow axis of another polarization maintaining optical fiber 24'-2 after passing through the λ/2 plate 24'-3, whereas the polarization component propagated along a slow axis of one polarization maintaining optical fiber 24'-1 is propagated along a fast axis of another polarization maintaining optical fiber 24'-2 after passing through the λ/2 plate 24'-3, just as in the case of the cross-splicing of FIG. 11.

Consequently, at the output ends of the optical Kerr medium 24', the birefringence of the optical Kerr medium 24' is totally compensated, and the relative position of the two principal axes polarization components on a time axis remains the same as in the input optical signal pulses, so that it also becomes possible to compensate the polarization dispersion between two principal axes by using this alternative configuration of FIG. 12A.

Figure 18A:
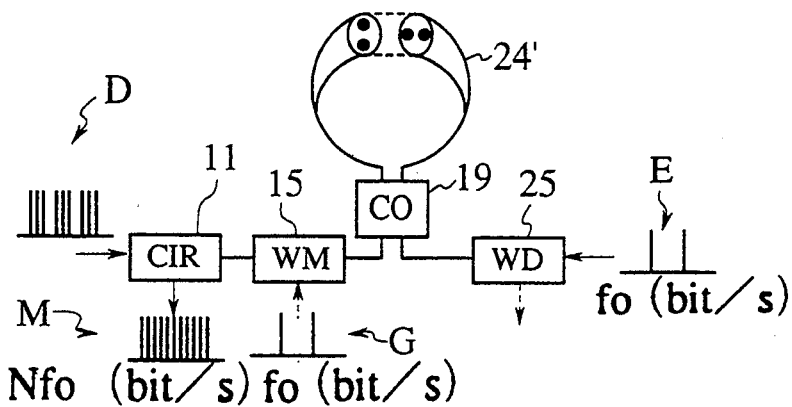
FIGS. 18A-18D, 19A-19F, 20A-20B, and 21A-21C are schematic block diagrams of various exemplary configurations for a nonlinear optical loop mirror that can be utilized in realizing the polarization independent optical time division multiplexer according to the present invention.

Next, as shown in FIG. 18A, two polarization maintaining optical fibers 24'-1 and 24'-2 can be connected with a 90° Faraday rotator 24'-4 inserted therebetween, while the fast axes and the slow axes of the polarization maintaining optical fibers aligned with each other. In this configuration, looking from the polarization maintaining optical fiber 24'-1 side, the 90° Faraday rotator 24'-4 rotates a direction of the linear polarization along the slow axis clockwise for 90° to turn it into a direction along the fast axis, as shown in FIG. 13B, while looking from the polarization maintaining optical fiber 24'-2 side, the 90° Faraday rotator 24'-4 rotates a direction of the linear polarization along the slow axis counter-clockwise for 90° to turn it into a direction along the fast axis, as shown in FIG. 13C.

Figure 13A:
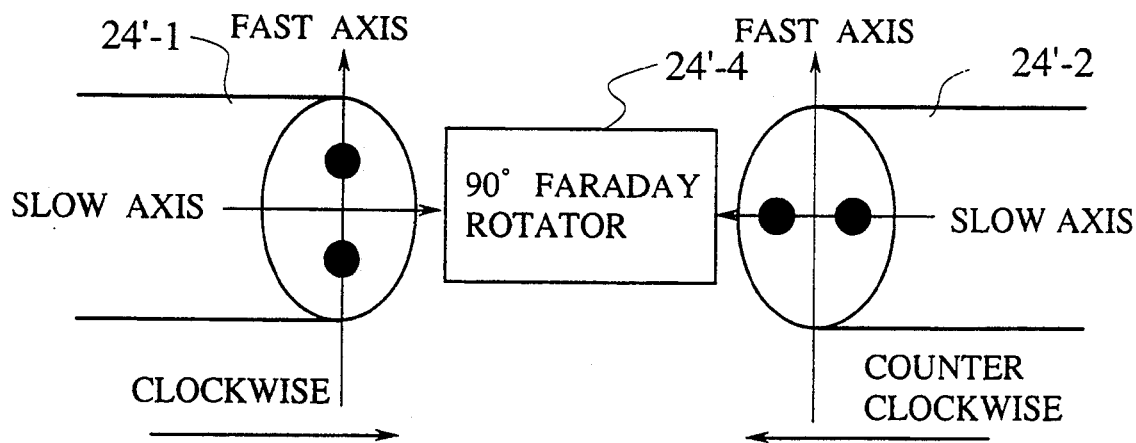
FIG. 13 is a schematic diagram indicating another alternative configuration for a birefringence compensation mechanism that can be used in the embodiments of FIGS. 3 and 6-10.
Figure 13B:
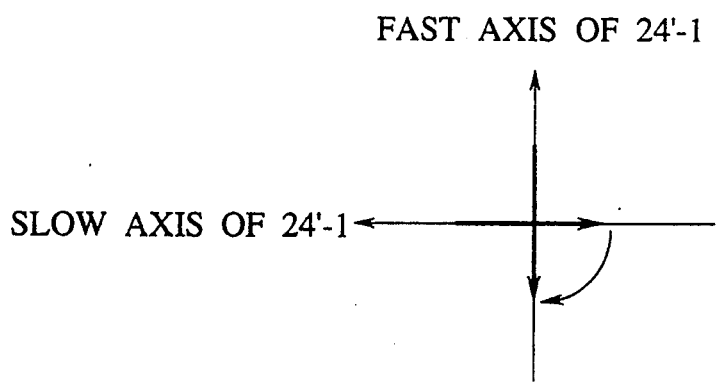
Figure 13C:
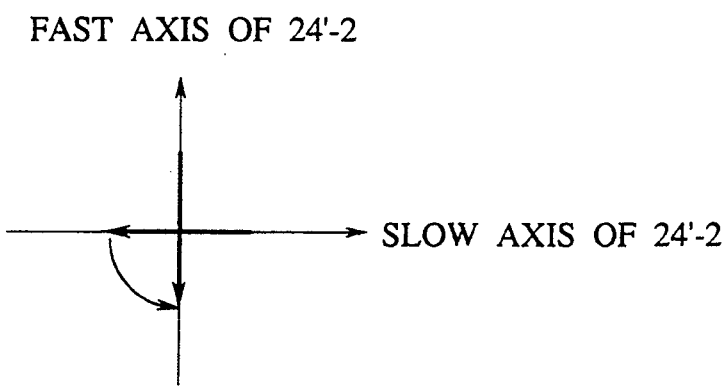

In this configuration of FIG. 13A, when the optical signal pulses and the optical control pulses propagate through the loop shaped optical Kerr medium 24', the polarization component propagated along a fast axis of one polarization maintaining optical fiber 24'-1 is propagated along a slow axis of another polarization maintaining optical fiber 24'-2 after passing through the 90° Faraday rotator 24'-4, whereas the polarization component propagated along a slow axis of one polarization maintaining optical fiber 24'-1 is propagated along a fast axis of another polarization maintaining optical fiber 24'-2 after passing through the 90° Faraday rotator 24'-4, just as in a case of the cross-splicing of FIG. 11.

Consequently, at the output ends of the optical Kerr medium 24', the birefringence of the optical Kerr medium 24' is totally compensated, and the relative position of the two principal axes polarization components on a time axis remains the same as in the input optical signal pulses, so that it also becomes possible to compensate the polarization dispersion between two principal axes by using this alternative configuration of FIG. 13A.

It is also to be noted that there are many variations for the configuration of the nonlinear optical loop mirror that can also be utilized in the present invention, instead of the configurations used in the various embodiments described above, as shown in FIG. 14A to FIG. 21C.

In these figures, the optical circulator 11 is represented by a box labelled CIR, the optical wavelength division multiplexer 15 is represented by a box labelled WM, the optical coupler 19 is represented by a box labelled CO, and the optical wavelength division demultiplexer 25 is represented by a box labelled WD, while the input optical signal pulses in the demultiplexer configuration are denoted as A, the output optical signal pulses in the demultiplexer configuration are denoted as B and C, the optical control pulses are denoted as G, the first and second input optical signal pulses in the multiplexer configuration are denoted as D and E, and the output multiplexed optical signal pulses in the multiplexer configuration are denoted as M. Also, in some of these figures, a wavelength independent type optical coupler 19' represented by a double line box labelled CO is used instead of the optical coupler 19 which is of a wavelength dependent type, and an additional optical wavelength division demultiplexer 25' represented by a box labelled WD are also used in addition to the optical wavelength division demultiplexer 25.

Figure 14A:
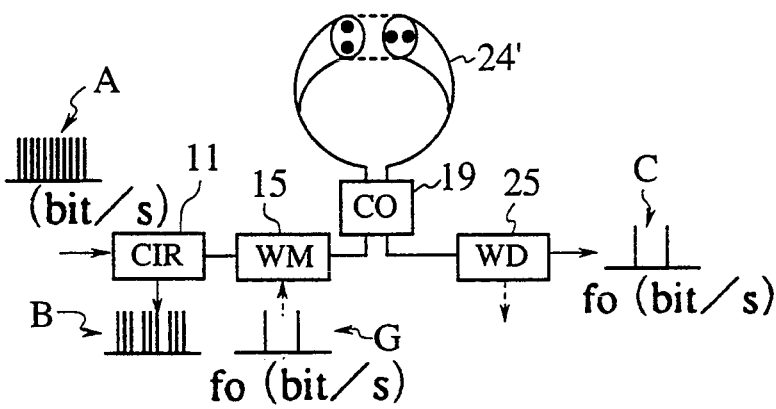
FIGS. 14A-14D, 15A-15F, 16A-16B, and 17A-17C are schematic block diagrams of various exemplary configurations of a nonlinear optical loop mirror that can be utilized in realizing the polarization independent optical time division demultiplexer according to the present invention.
Figure 14B:
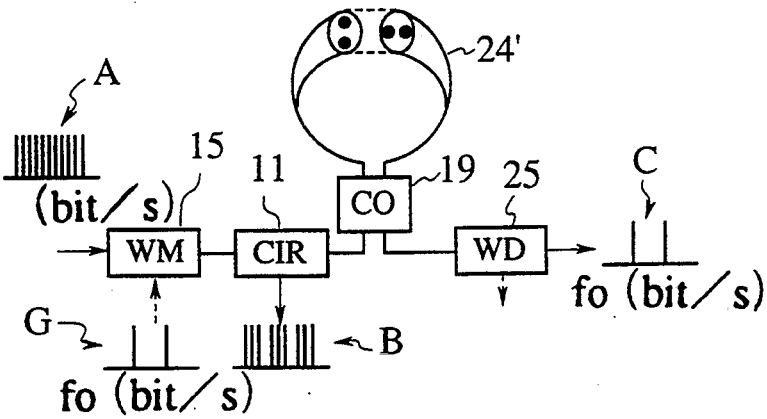
Figure 14C:
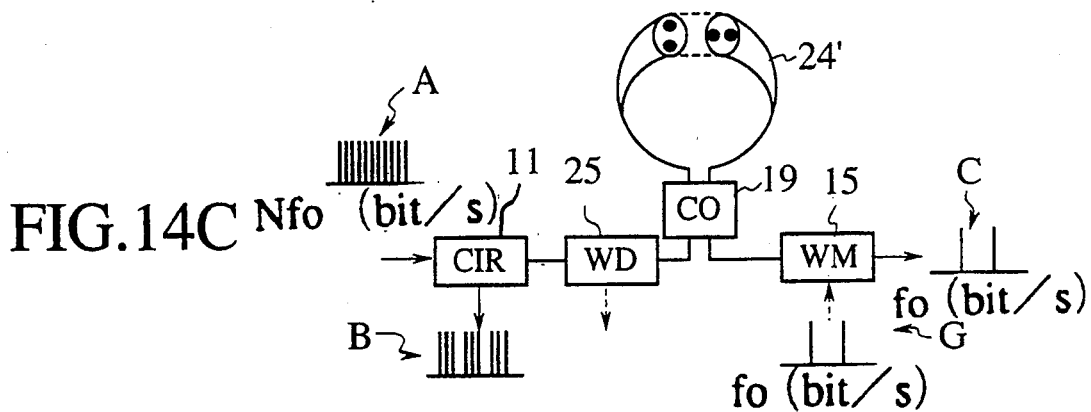
Figure 14D:
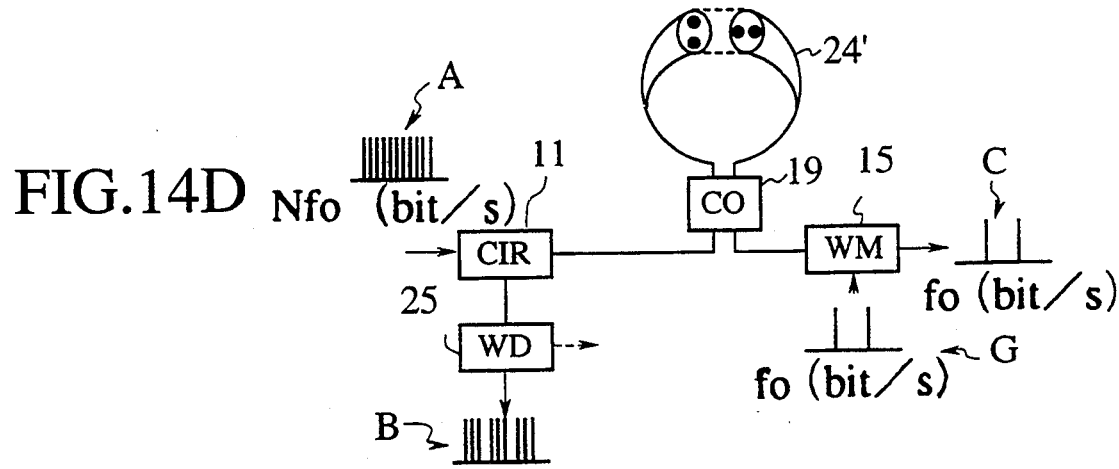

More specifically, the first embodiment of the all-optical polarization independent optical time division demultiplexer of FIG. 3 can be simplified as shown in FIG. 14A, and this configuration of FIG. 14A can be modified as shown in FIGS. 14B, 14C and 14D, of which: FIG. 14B shows a case in which the positions of the optical circulator 11 and the optical wavelength division multiplexer is in FIG. 14A are exchanged; FIG. 14C shows a case in which the positions of the optical wavelength division multiplexer 15 and the optical wavelength division demultiplexer 25 in FIG. 14A are exchanged so as to propagate the optical control pulses G in an opposite direction; and FIG. 14D shows a case in which the position of the optical wavelength division demultiplexer 25 between the optical circulator 11 and the optical coupler 19 in FIG. 14C is changed to a position connected with the optical circulator 11 alone.

Figure 15A:
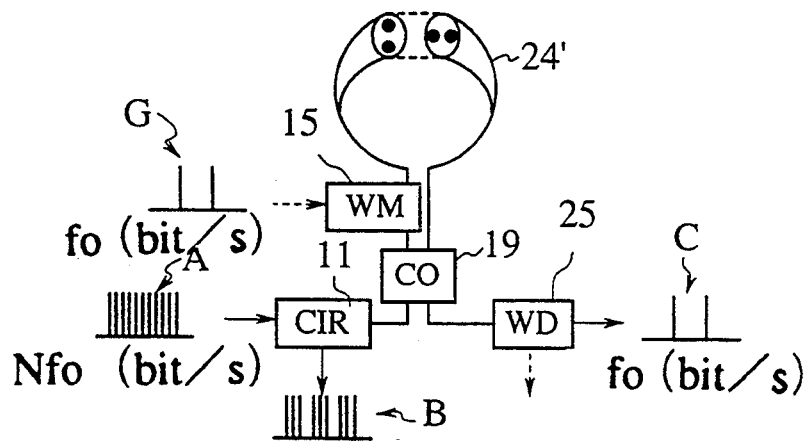
Figure 15B:
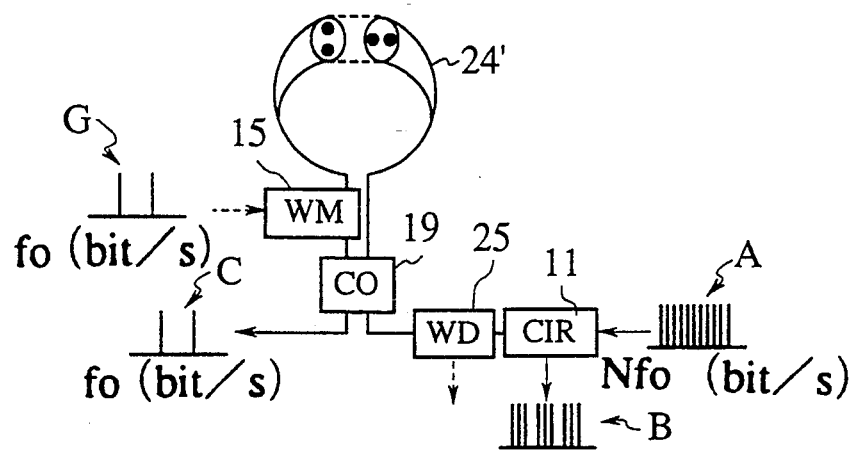
Figure 15C:
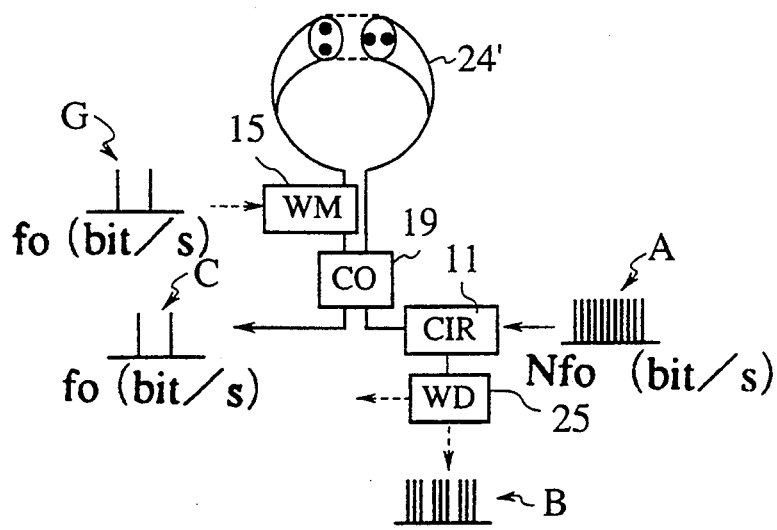
Figure 15D:
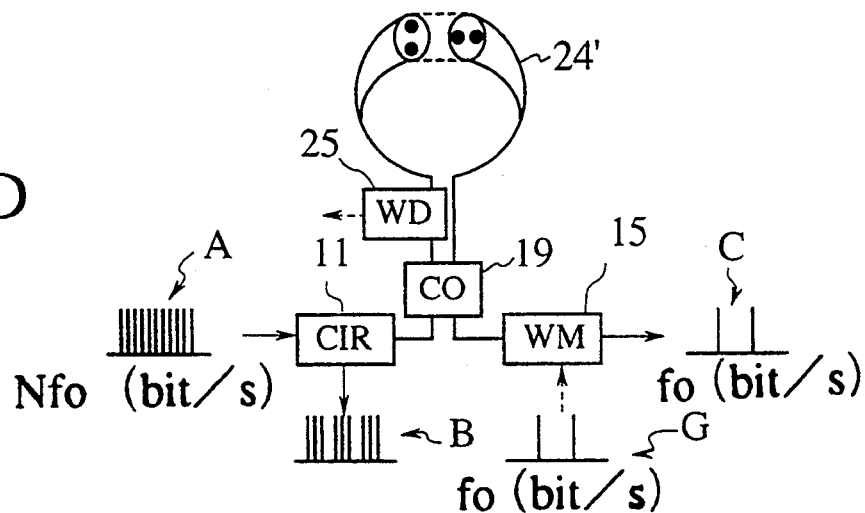
Figure 15E:
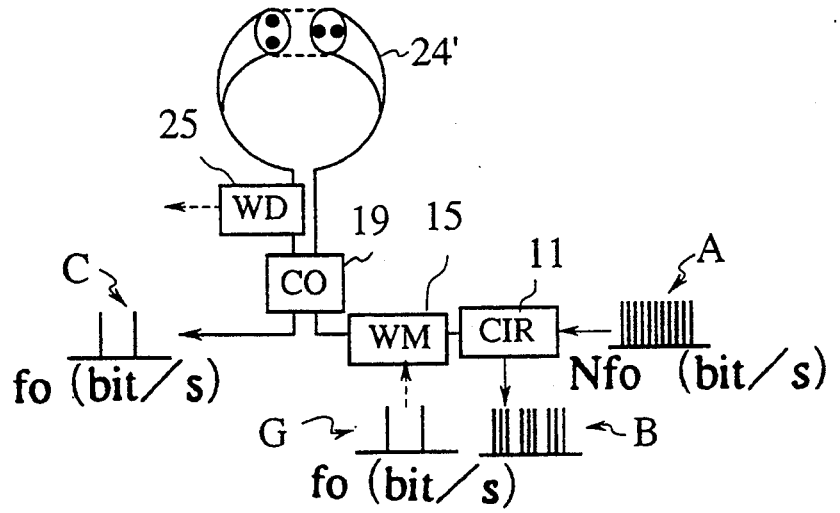
Figure 15F:
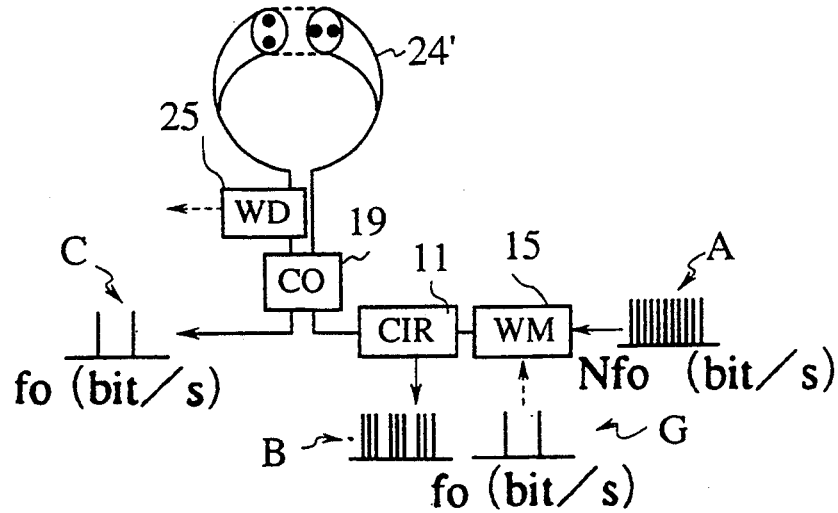

In addition, the configuration of FIG. 14A can also be modified as shown in FIGS. 15A, 15B, 15C, 15D, 15E and 15F, of which: FIG. 15A shows a case in which the position of the optical wavelength division multiplexer 15 between the optical circulator 11 and the optical coupler 19 in FIG. 14A is changed to a position between the optical coupler 19 and the optical Kerr medium 24'; 15B shows a case in which the position of the optical circulator 11 on an opposite side of the optical wavelength division demultiplexer 25 in FIG. 15A is changed to a position connected with the optical wavelength division demultiplexer 25; FIG. 15C shows a case in which the position of the optical wavelength division demultiplexer 25 between the optical circulator 11 and the optical coupler 19 in FIG. 15B is changed to a position connected with the optical circulator 11 alone; FIG. 15D shows a case in which the positions of the optical wavelength division multiplexer 15 and the optical wavelength division demultiplexer 25 in FIG. 15A are exchanged so as to propagate the optical control pulses G in an opposite direction; FIG. 15E shows a case in which the position of the optical circulator 11 on an opposite side of the optical wavelength division multiplexer 15 in FIG. 15D is changed to a position connected with the optical wavelength division multiplexer 15; and FIG. 15F shows a case in which the positions of the optical circulator 11 and the optical wavelength division multiplexer 15 in FIG. 15E are exchanged.

Figure 16A:
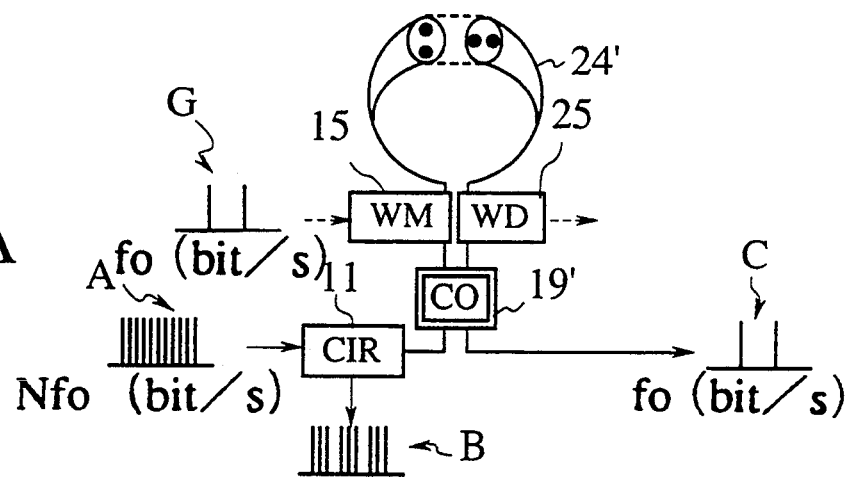
Figure 16B:
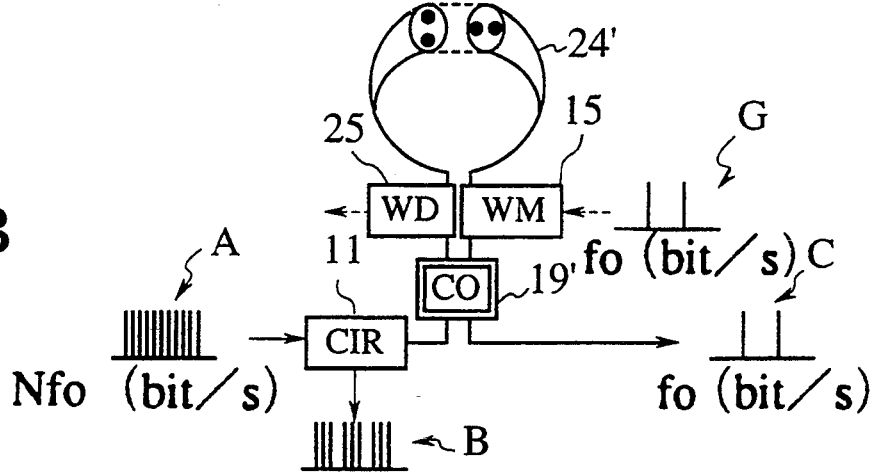

Moreover, the configuration of FIG. 15A can also be modified as shown in FIGS. 16A and 16B, of which: FIG. 16A shows a case in which the optical coupler 19 of the wavelength dependent type is replaced by the optical coupler 19' of the wavelength independent type, and the position of the optical wavelength division demultiplexer 25 in FIG. 15A is changed to a position between the optical coupler 19' and the optical Kerr medium 24'; and FIG. 16B shows a case in which the positions of the optical wavelength division multiplexer 15 and the optical wavelength division demultiplexer 25 in FIG. 16A are exchanged. From a point of view of a practical implementation of the all-optical polarization independent optical time division demultiplexer according to the present invention, these configurations of FIGS. 16A and 16B are preferable.

Figure 17A:
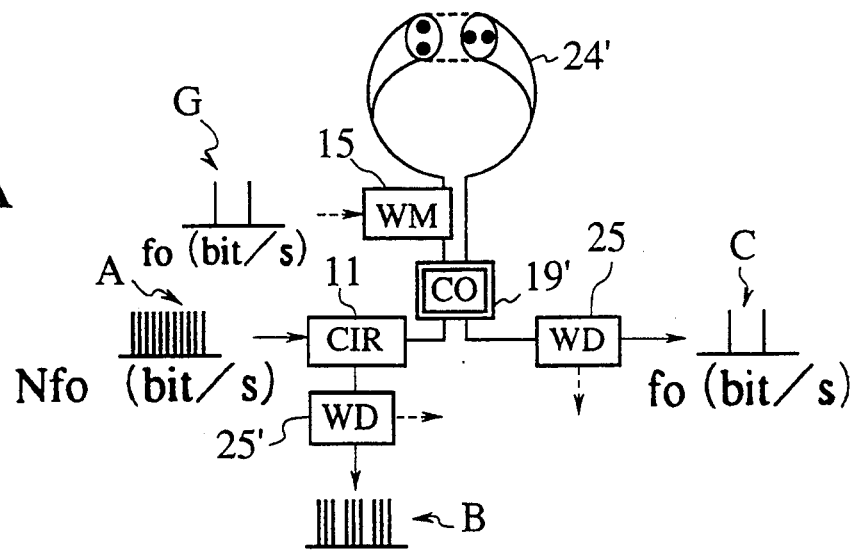
Figure 17B:
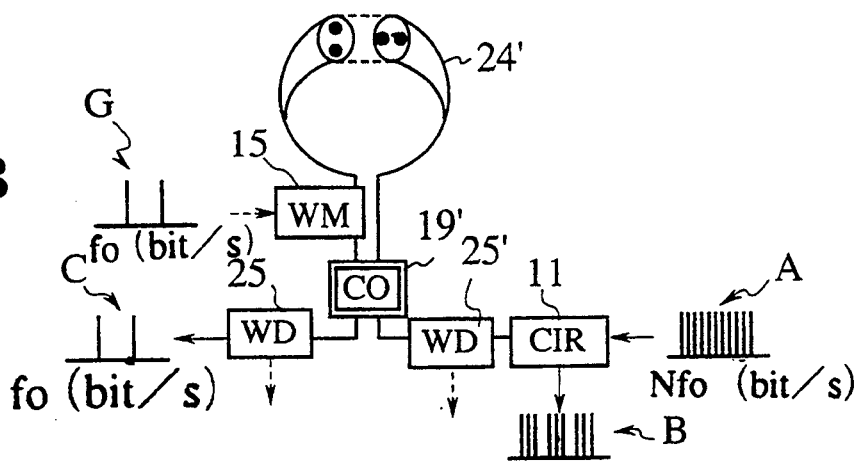
Figure 17C:
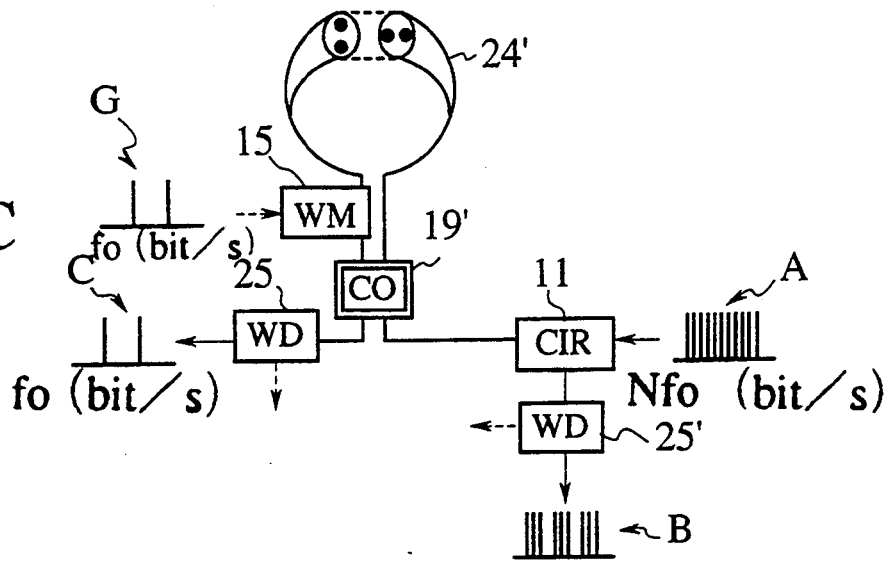

Furthermore, the second embodiment of the all-optical polarization independent optical time division demultiplexer of FIG. 6 can be simplified as shown in FIG. 17A, and this configuration of FIG. 17A can be modified as shown in FIGS. 17B and 17C, of which: FIG. 17B shows a case in which the positions of the optical circulator 11 and the optical wavelength division demultiplexer 25 in FIG. 17A are exchanged; and FIG. 17C shows a case in which the position of the additional optical wavelength division demultiplexer 25' between the optical circulator 11 and the optical coupler 19' in FIG. 17B is changed to a position connected with the optical circulator 11 alone.

Figure 18B:
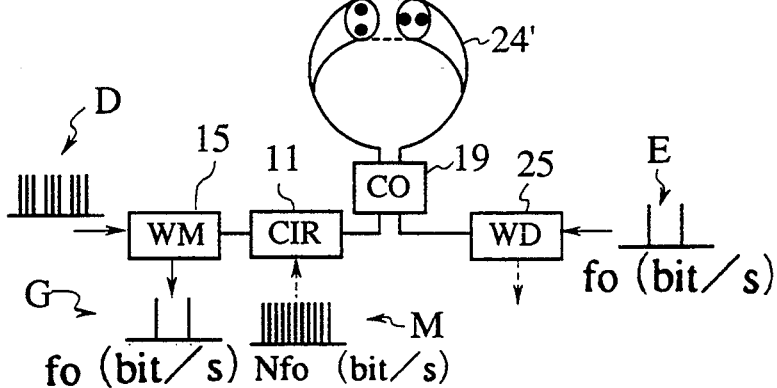
Figure 18C:
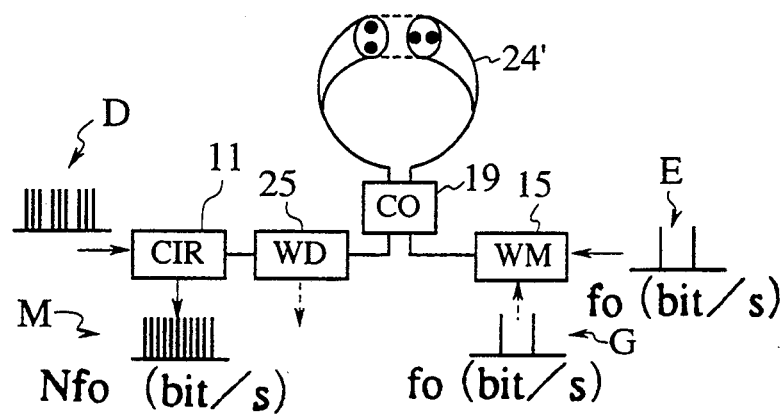
Figure 18D:
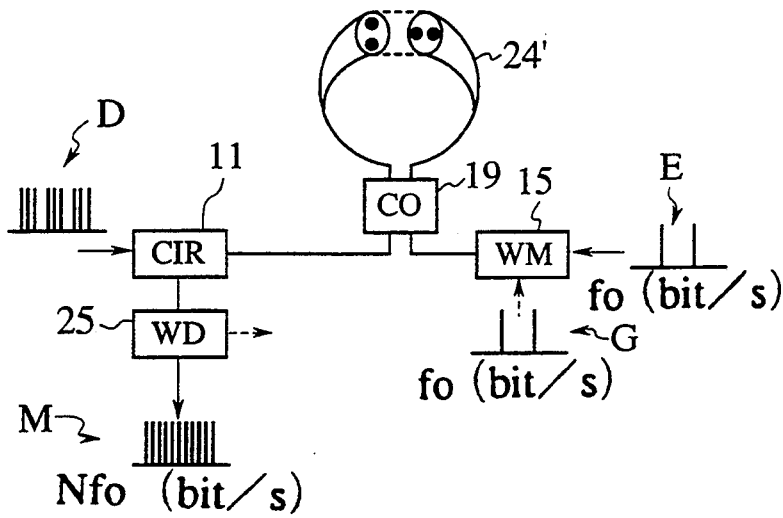

In the similar manner, the first embodiment of the all-optical polarization independent optical time division multiplexer of FIG. 7 can be simplified as shown in FIG. 18A, and this configuration of FIG. 18A can be modified as shown in FIGS. 18B, 18C and 18D, which show the modifications similar to those of FIGS. 14B, 14C, and 14D with respect to FIG. 14A. Of these, FIG. 18C is substantially equivalent to the configuration of the second embodiment of FIG. 8 described above.

In addition, the configuration of FIG. 18A can also be modified as shown in FIGS. 19A, 19B, 19C, 19D, 19E and 19F, which show the modifications similar to those of FIGS. 15A, 15B, 15C, 15D, 15E and 15F with respect to FIG. 14A.

Figure 19A:
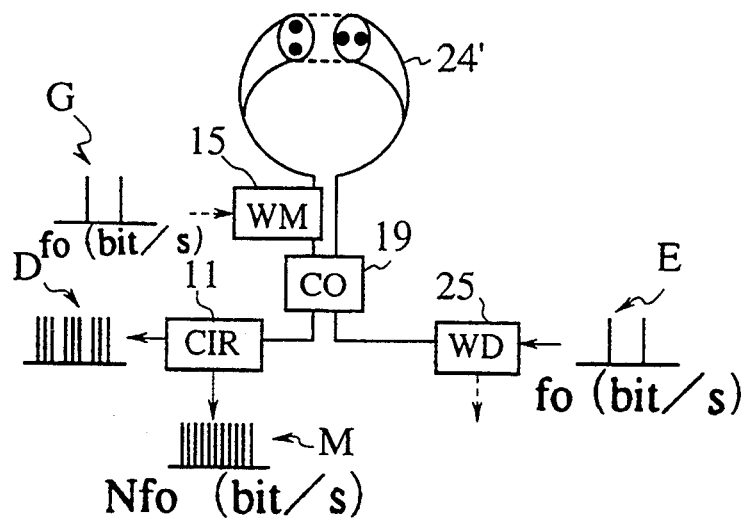
Figure 19B:
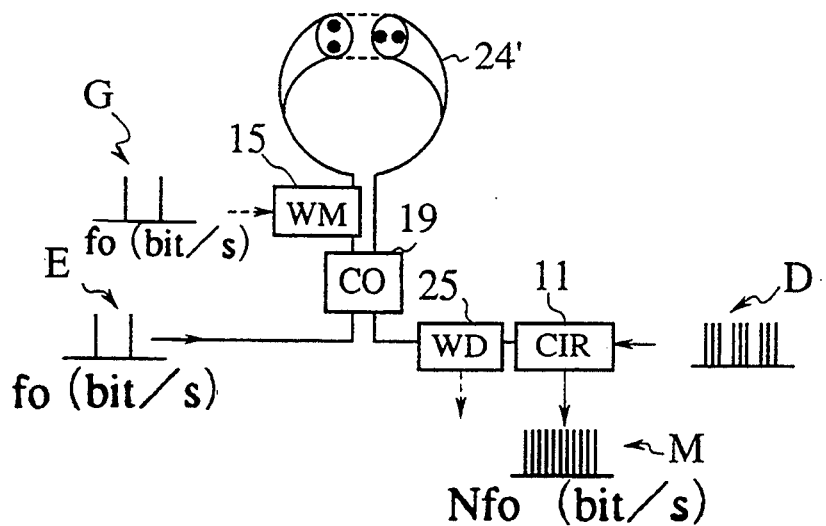
Figure 19C:
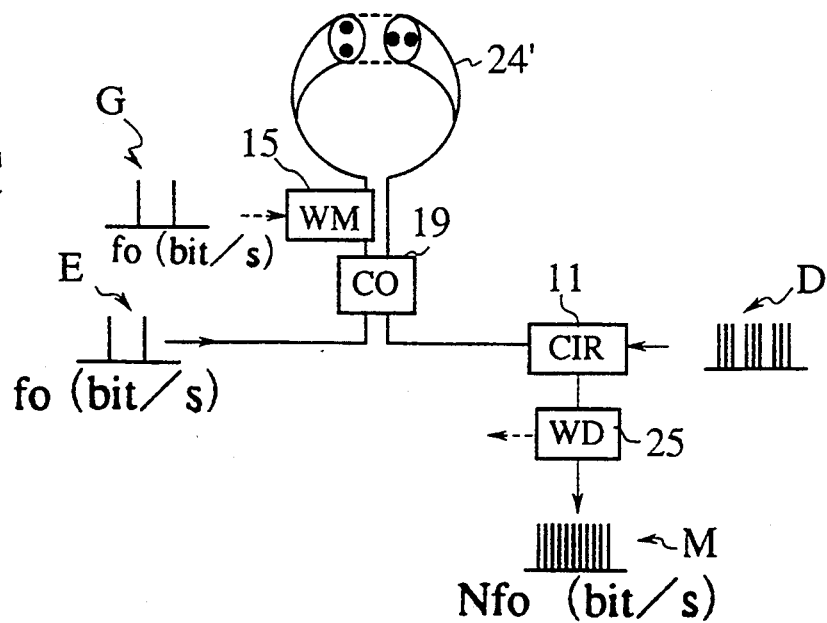
Figure 19D:
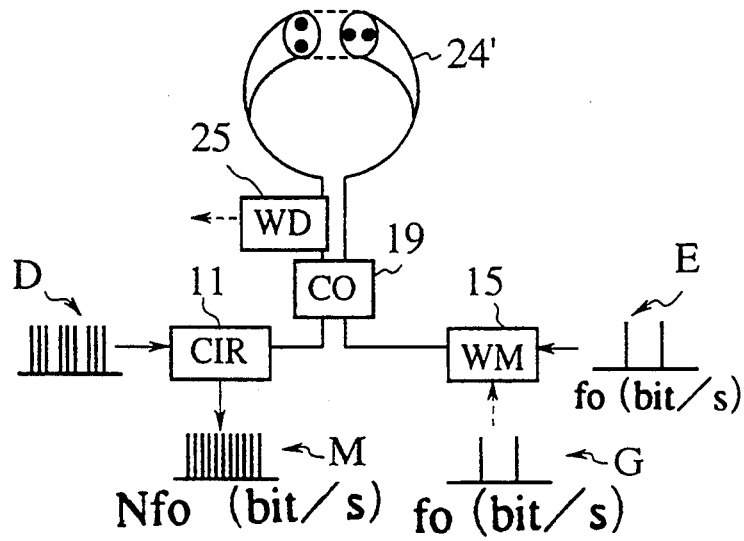
Figure 19E:
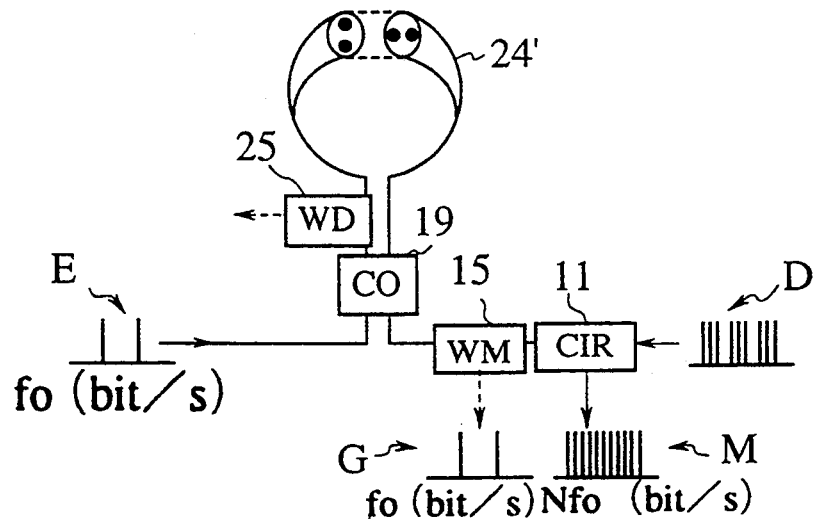
Figure 19F:
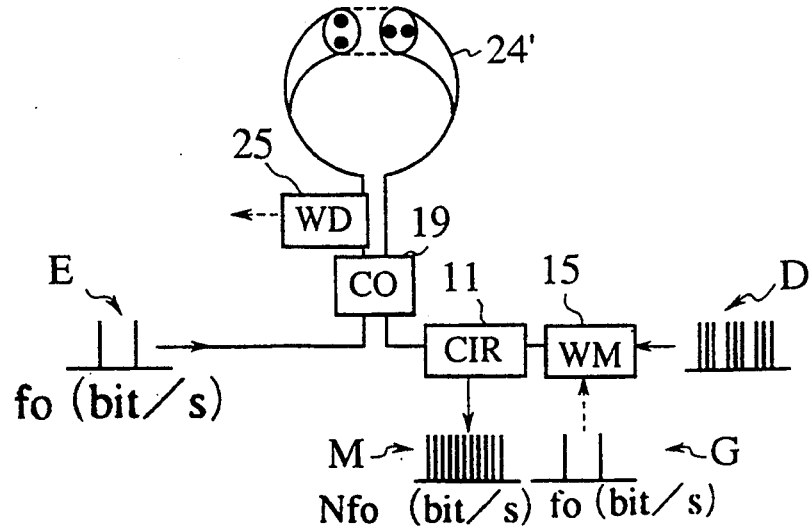
Figure 20A:
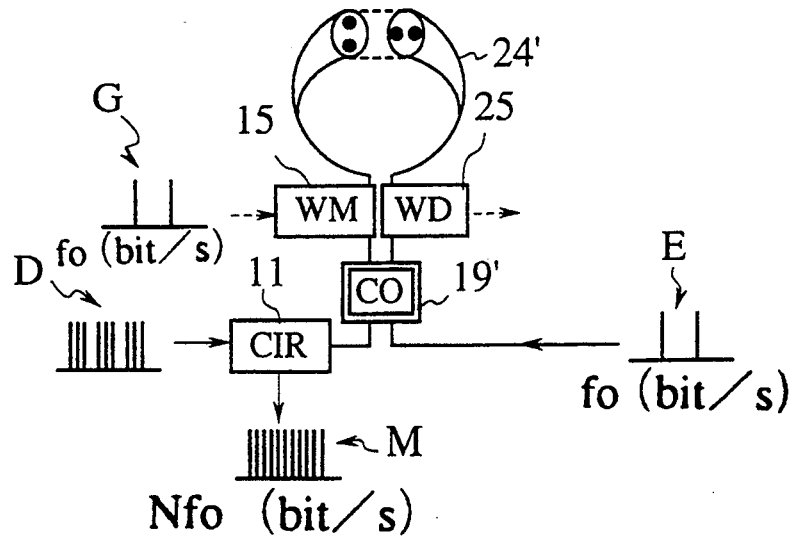
Figure 20B:
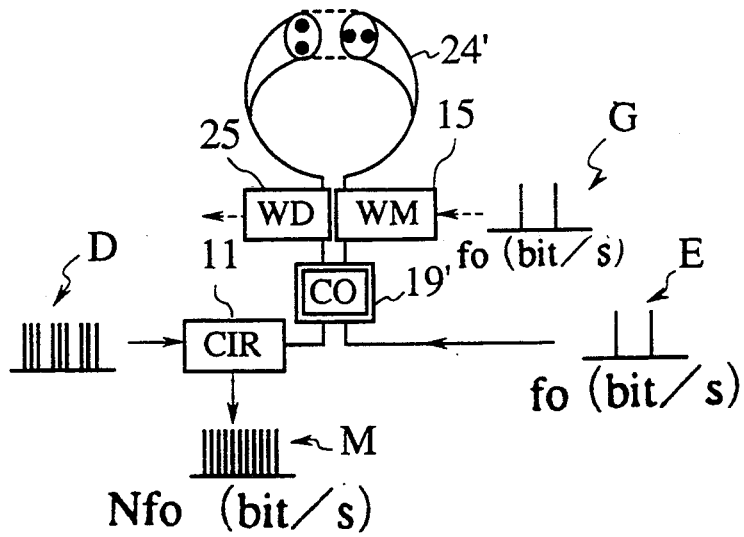

Moreover, the configuration of FIG. 19A can also be modified as shown in FIGS. 20A and 20B, which show the modifications similar to those of FIGS. 16A and 16B with respect to FIG. 15A. From a point of view of a practical implementation of the all-optical polarization independent optical time division multiplexer according to the present invention, these configurations of FIGS. 20A and 20B are preferable.

Figure 21A:
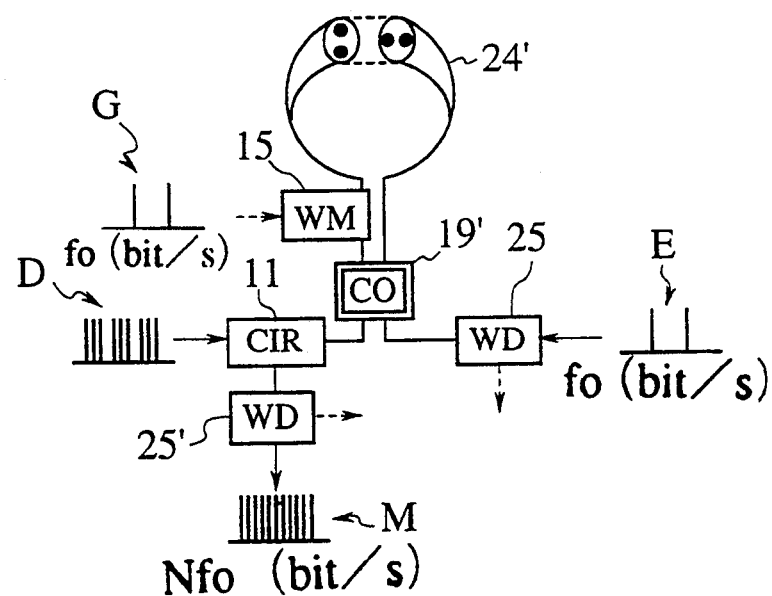
Figure 21B:
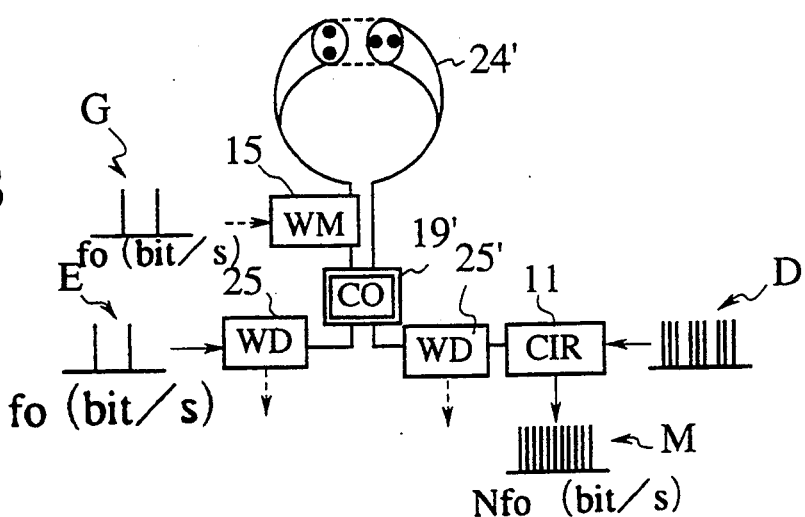
Figure 21C:
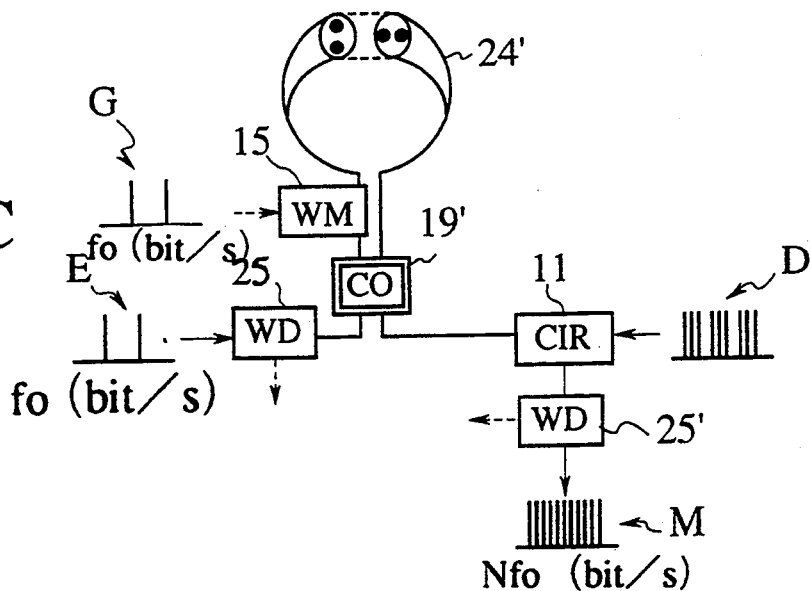

Furthermore, the third embodiment of the all-optical polarization independent optical time division multiplexer of FIG. 9 can be simplified as shown in FIG. 21A, and this configuration of FIG. 21A can be modified as shown in FIGS. 21B and 21C, which show the modifications similar to those of FIGS. 17B and 17C with respect to FIG. 17A. Of these, FIG. 21B is substantially equivalent to the configuration of the fourth embodiment of FIG. 10 described above.

It is also to be noted here that, apart from the straightforward usage of the all-optical polarization independent optical time division multiplexer and demultiplexer of the present invention for multiplexing and demultiplexing optical signal pulses, the all-optical polarization independent optical time division demultiplexer of the present invention can also be utilized as an optical sampling device as follows.

Figure 22:
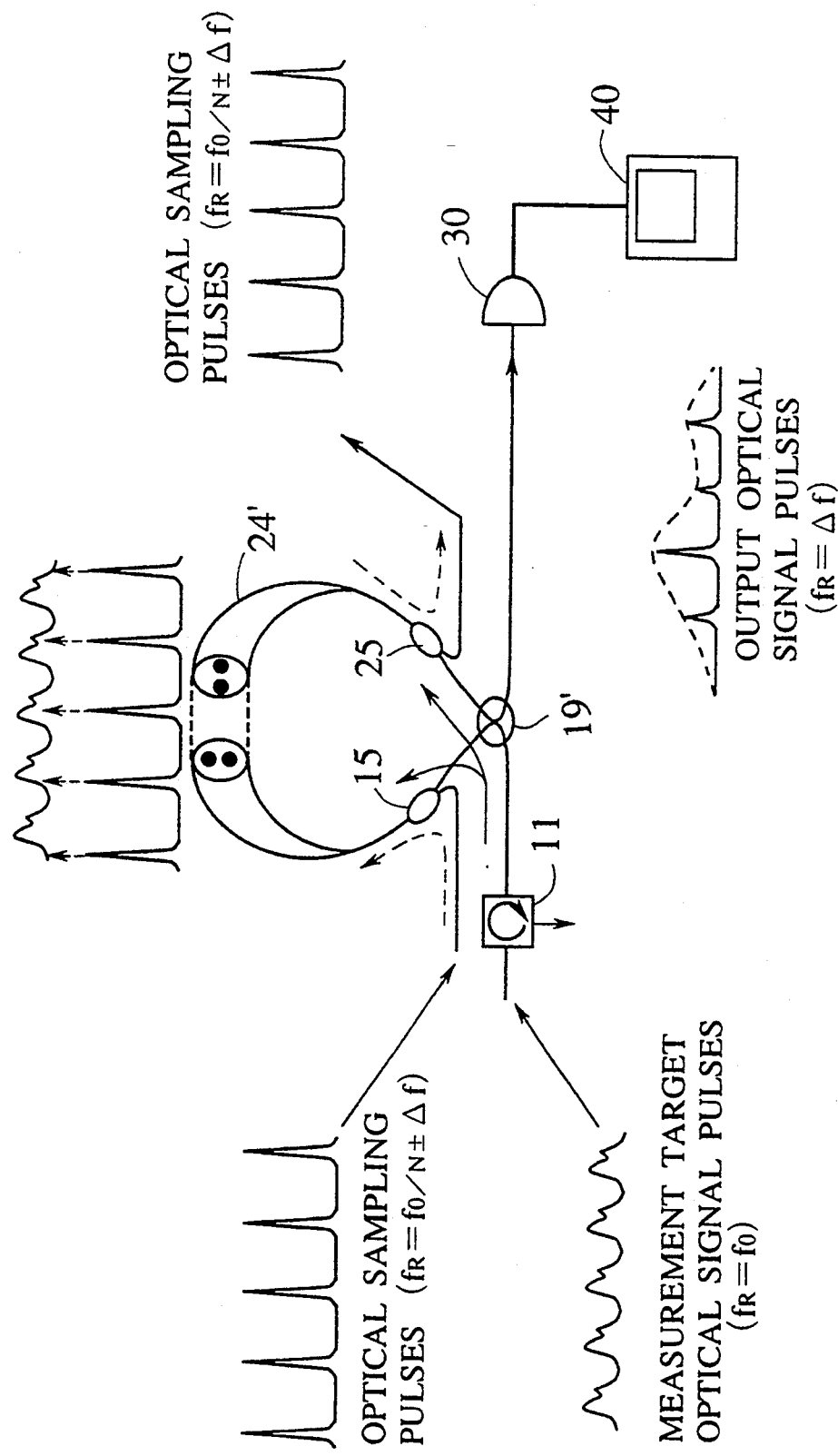
FIG. 22 is a schematic block diagram of an optical sampling device utilizing a polarization independent optical time division demultiplexer according to the present invention.

Namely, as shown in FIG. 22, in order to measure the waveform of each pulse of the measurement target optical signal pulses having a repetition frequency $f_R = F_0$, the optical sampling pulses with a repetition frequency $f_R = f_0/N \pm \Delta f$ are used in place of the optical control pulses. In general, the repetition frequency $f_R$ of the optical sampling pulses must be either smaller or larger than an 1/N divided frequency of a repetition frequency of the measurement target optical signal pulses by a prescribed small amount $\Delta f$.

As a result, the successive optical sampling pulses sample the measurement target optical signal pulses at the relative positions within each optical signal pulse displaced for $\Delta T = N^2 \Delta f / f_0^2$ successively. Consequently, an envelop of the output optical signal pulses indicates a waveform of each of the measurement target optical signal pulses enlarged along a time axis at an enlargement rate of $f_0/N\Delta f$, as indicated in FIG. 22.

Therefore, by feeding the output optical signal pulses obtained by the all-optical polarization independent optical time division demultiplexer of the present invention to an optical signal receiver 30 and an oscilloscope 40, a waveform of each of the measurement target optical signal pulses can be displayed on the oscilloscope 40 for visual inspection, even when the measurement target optical signal pulses have a very high frequency.

It is further to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A polarization independent optical time division demultiplexer, comprising:
   wavelength-division-multiplexing coupler means for wavelength-division-multiplexing time-division-multiplexed optical signal pulses and optical control pulses, and splitting the optical signal pulses at a splitting ratio of 1:1 into two ports, the optical control pulses being in a polarization state in which two orthogonally polarized components have a substantially identical amplitude;
   an optical Kerr medium with birefringence, for connecting said two ports of the wavelength-division-multiplexing coupler means, the optical Kerr medium incorporating birefringence compensation means for compensating a polarization dispersion between two principal axes of the birefringence; and
   wavelength division demultiplexer means for wavelength division demultiplexing time-wise overlapping optical signal pulses and optical control pulses propagated through the optical Kerr medium, to obtain time-division-demultiplexed optical signal pulses.

2. The demultiplexer of claim 1, wherein the birefringence compensation means comprises cross-splicing at 90° of two polarization maintaining optical fibers of an identical length.

3. The demultiplexer of claim 1, wherein the birefringence compensation means comprises a connection of two polarization maintaining optical fibers of an identical length with a λ/2 plate inserted therebetween.

4. The demultiplexer of claim 1, wherein the birefringence compensation means comprises a connection of two polarization maintaining optical fibers of an identical length with a 90° Faraday rotator inserted therebetween.

5. The demultiplexer of claim 1, wherein the optical control pulses are in forms of sampling optical pulses having a repetition frequency different from an 1/N divided frequency of a repetition frequency of the optical signal pulses by a prescribed amount, where N is an integer, such that an envelope of an output of the wavelength division demultiplexer means indicates a time-wise enlarged waveform of each of the optical signal pulses.

6. The demultiplexer of claim 1, wherein the wavelength-division-multiplexing coupler means further comprises:
   wavelength division multiplexer for wavelength-division-multiplexing the time-division-multiplexed optical signal pulses and the optical control pulses; and
   optical coupler for coupling the optical signal pulses and the optical control pulses which are wavelength-division-multiplexed by the wavelength division multiplexer into said two ports by splitting the optical signal pulses at the splitting ratio of 1:1 into said two ports and the optical control pulses at a splitting ratio of 1:0 into one of said two ports.

7. The demultiplexer of claim 1, wherein the wavelength-division-multiplexing coupler means further comprises:
   optical coupler having two output ports corresponding to said two ports of the wavelength-division-multiplexing coupler means, for coupling the optical signal pulses into said two output ports by splitting the optical signal pulses at the splitting ratio of 1:1 into said two output ports; and
   wavelength division multiplexer, connected between the one of said two output ports of the optical coupler means and the optical Kerr medium, for wavelength division multiplexing the time-division-multiplexed optical signal pulses split into said one of said two output ports of the optical coupler means and the optical control pulses and supplying the wavelength-division-multiplexed optical signal pulses and optical control pulses into the optical Kerr medium through one of said two ports of the wavelength-division-multiplexing coupler means corresponding to said one of said two output ports of the optical coupler means.

8. The demultiplexer of claim 7, wherein the wavelength division demultiplexer means is connected between another one of said two output ports of the optical coupler means and the optical Kerr medium.

9. The demultiplexer of claim 1, further comprising:
   optical circulator means for supplying the time-division-multiplexed optical signal pulses to the wavelength-division-multiplexing coupler means.

10. The demultiplexer of claim 9, wherein the optical circulator means receives the optical signal pulses not overlapping with the optical control pulses and propagated through the optical Kerr medium from the wavelength-division-multiplexing coupler means.

11. A polarization independent optical time division multiplexer, comprising:
wavelength-division-multiplexing coupler means for wavelength-division-multiplexing time-division-multiplexed first optical signal pulses and optical control pulses, and splitting the first optical signal pulses at a splitting ratio of 1:1 into two ports, the optical control pulses being in a polarization state in which two orthogonally polarized components have a substantially identical amplitude;
an optical Kerr medium with birefringence, for connecting said two ports of the wavelength-division-multiplexing coupler means, the optical Kerr medium incorporating birefringence compensation means for compensating a polarization dispersion between two principal axes of the birefringence; and
wavelength division demultiplexer means for supplying time-division-multiplexed second optical signal pulses to the optical Kerr medium through the wavelength-division-multiplexing coupler means;
wherein time-division-multiplexed optical signal pulses in which the first and second optical signal pulses are time-division-multiplexed at the optical Kerr medium are outputted from one of the wavelength-division-multiplexing coupler means and the wavelength division demultiplexer means.

12. The multiplexer of claim 11, wherein the birefringence compensation means comprises cross-splicing at 90° of two polarization maintaining optical fibers of an identical length.

13. The multiplexer of claim 11, wherein the birefringence compensation means comprises a connection of two polarization maintaining optical fibers of an identical length with a λ/2 plate inserted therebetween.

14. The multiplexer of claim 11, wherein the birefringence compensation means comprises a connection of two polarization maintaining optical fibers of an identical length with a 90° Faraday rotator inserted therebetween.

15. The multiplexer of claim 11, wherein the wavelength-division-multiplexing coupler means further comprises:
wavelength division multiplexer for wavelength-division-multiplexing the time-division-multiplexed first optical signal pulses and the optical control pulses; and
optical coupler for coupling the first optical signal pulses and the optical control pulses which are wavelength-division-multiplexed by the wavelength division multiplexer into said two ports by splitting the first optical signal pulses at the splitting ratio of 1:1 into said two ports and the optical control pulses at a splitting ratio of 1:0 into one of said two ports.

16. The multiplexer of claim 11, wherein the wavelength-division-multiplexing coupler means further comprises:
optical coupler having two output ports corresponding to said two ports of the wavelength-division-multiplexing coupler means, for coupling the first optical signal pulses into said two output ports by splitting the optical signal pulses at the splitting ratio of 1:1 into said two output ports; and
wavelength division multiplexer, connected between one of said two output ports of the optical coupler means and the optical Kerr medium, for wavelength-division-multiplexing the time-division-multiplexed first optical signal pulses split into said one of said two output ports of the optical coupler means and the optical control pulses and supplying the wavelength-division-multiplexed first optical signal pulses and optical control pulses into the optical Kerr medium through one of said two ports of the wavelength-division-multiplexing coupler means corresponding to said one of said two output ports of the optical coupler means.

17. The multiplexer of claim 16, wherein the wavelength division demultiplexer means is connected between another one of said two output ports of the optical coupler means and the optical Kerr medium.

18. The multiplexer of claim 11, further comprising:
optical circulator means for supplying one of the time-division-multiplexed first optical signal pulses and the time-division-multiplexed second optical signal pulses to said one of the wavelength-division-multiplexing coupler means and the wavelength division demultiplexer means.

19. The demultiplexer of claim 18, wherein the optical circulator means receives the time-division-multiplexed optical signal pulses from said one of the wavelength-division-multiplexing coupler means and the wavelength division demultiplexer means.

20. The multiplexer of claim 18, wherein the optical circulator means supplies said one of the time-division-multiplexed first optical signal pulses and the time-division-multiplexed second optical signal pulses to said one of the wavelength-division-multiplexing coupler means and the wavelength division demultiplexer means at such timings that the optical control pulses and said one of the time-division-multiplexed first optical signal pulses and the time-division-multiplexed second optical signal pulses overlap with each other time-wise in the optical Kerr medium.

* * * * *

UNITED STATES PATENT AND TRADEMARK OFFICE
CERTIFICATE OF CORRECTION

PATENT NO. : 5,357,359
DATED : October 18, 1994
INVENTOR(S) : Uchiyama, et al

It is certified that error appears in the above-indentified patent and that said Letters Patent is hereby corrected as shown below:

col. 6 line 45 " $= (2\pi/\lambda s) (L \bullet n2^H \bullet Ix + \eta \bullet L \bullet n2^V \bullet Iy)$" should be changed to -- $=2(2\pi/\lambda s) (L \bullet n2^H \bullet Ix + \eta \bullet L \bullet n2^V \bullet Iy)$. --
at col. 6 line 63 "$= (2\pi/\lambda) (L \bullet n2^H \bullet Iy + \eta \bullet L \bullet n2^V \bullet Iy)$" should be changed to -- $=2(2\pi/\lambda s) (L \bullet n2^H \bullet Iy + \eta \bullet L \bullet n2^V \bullet Ix)$. --

Signed and Sealed this

Sixth Day of June, 1995

Attest:

BRUCE LEHMAN

*Attesting Officer*   *Commissioner of Patents and Trademarks*